(12) United States Patent
Maeda

(10) Patent No.: US 10,481,001 B2
(45) Date of Patent: Nov. 19, 2019

(54) OPTICAL SPECTRUM MEASURING APPARATUS AND OPTICAL SPECTRUM MEASURING METHOD

(71) Applicant: Otsuka Electronics Co., Ltd., Osaka (JP)

(72) Inventor: Goro Maeda, Hirakata (JP)

(73) Assignee: Otsuka Electronics Co., Ltd., Osaka (JP)

( * ) Notice: Subject to any disclaimer, the term of this patent is extended or adjusted under 35 U.S.C. 154(b) by 11 days.

(21) Appl. No.: 15/865,701

(22) Filed: Jan. 9, 2018

(65) Prior Publication Data

US 2018/0224331 A1 Aug. 9, 2018

(30) Foreign Application Priority Data

Feb. 7, 2017 (JP) ................................. 2017-020787

(51) Int. Cl.
*G01J 3/02* (2006.01)
*G01J 3/28* (2006.01)

(52) U.S. Cl.
CPC ........... *G01J 3/2803* (2013.01); *G01J 3/0208* (2013.01); *G01J 3/0229* (2013.01); *G01J 3/0262* (2013.01); *G01J 3/2823* (2013.01); *G01J 2003/282* (2013.01)

(58) Field of Classification Search
CPC ........ G01J 3/28; G01J 3/00; G01J 3/02; G01J 1/58; G01N 27/447; G01N 21/64; H04N 5/353; H04N 5/372; H04N 5/335; H04N 5/378; H04N 9/04; H01L 27/48; H01L 27/146
See application file for complete search history.

(56) References Cited

U.S. PATENT DOCUMENTS

| 7,151,568 B2 | 12/2006 | Kawachi et al. |
| 2002/0159074 A1 | 10/2002 | Kawachi et al. |
| 2006/0007439 A1* | 1/2006 | Corcoran ................. G01J 3/02 356/317 |
| 2009/0050786 A1* | 2/2009 | Baiko ...................... G01J 3/02 250/207 |

FOREIGN PATENT DOCUMENTS

| JP | H10-145679 A | 5/1998 |
| JP | 2000-324400 A | 11/2000 |
| JP | 2001-268444 A | 9/2001 |
| JP | 2001-268446 A | 9/2001 |
| JP | 2003-298959 A | 10/2003 |
| JP | 2010-266538 A | 11/2010 |

OTHER PUBLICATIONS

"Spectroscope," Wikipedia, [online], [searched on Jan. 4, 2017], Internet <URL: https://ja.wikipedia.org/wiki/%E5%88%86%E5%85%89%E5%99%A8>.

* cited by examiner

*Primary Examiner* — Abdullahi Nur
(74) *Attorney, Agent, or Firm* — Studebaker & Brackett PC

(57) ABSTRACT

An optical spectrum measuring apparatus includes: a CCD (Charge Coupled Device) detector including a plurality of light-receiving devices that are two-dimensionally arranged; an optical system configured to split incident light into rays and irradiate the CCD detector with the rays; and a restriction unit configured to restrict one or more rows and/or one or more columns out of the rows and columns of the plurality of light-receiving devices from being irradiated with light from the optical system.

7 Claims, 20 Drawing Sheets

FIG. 3
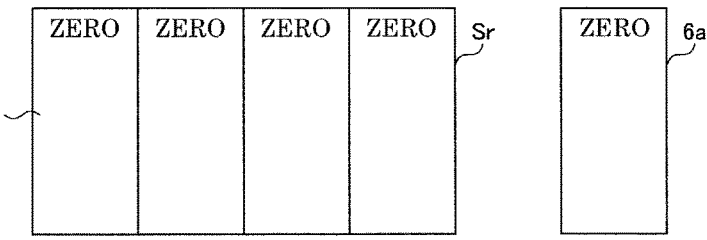
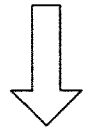
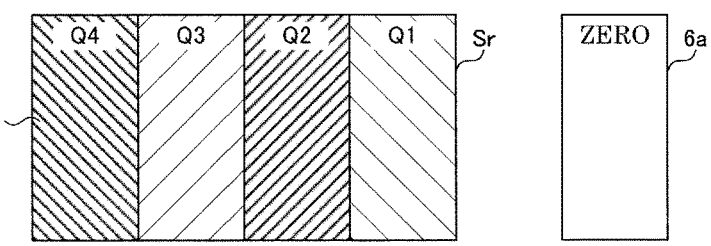

FIG. 12
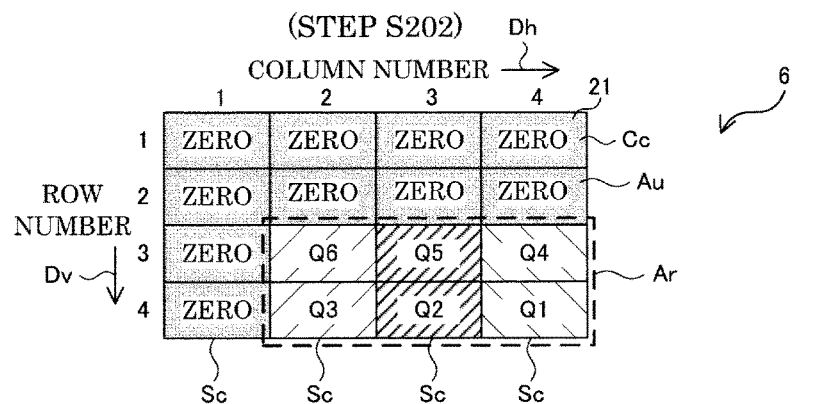
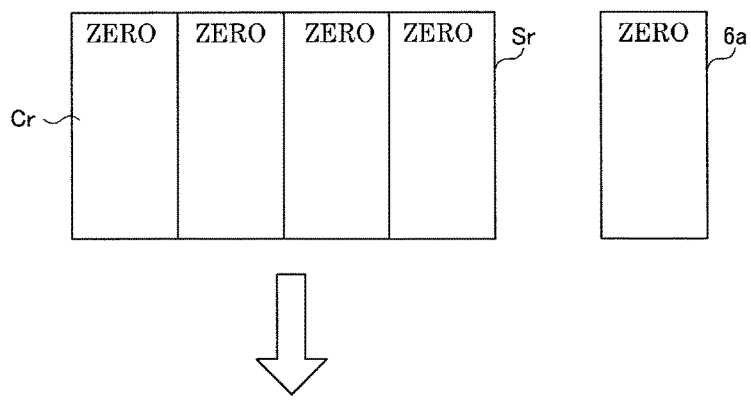
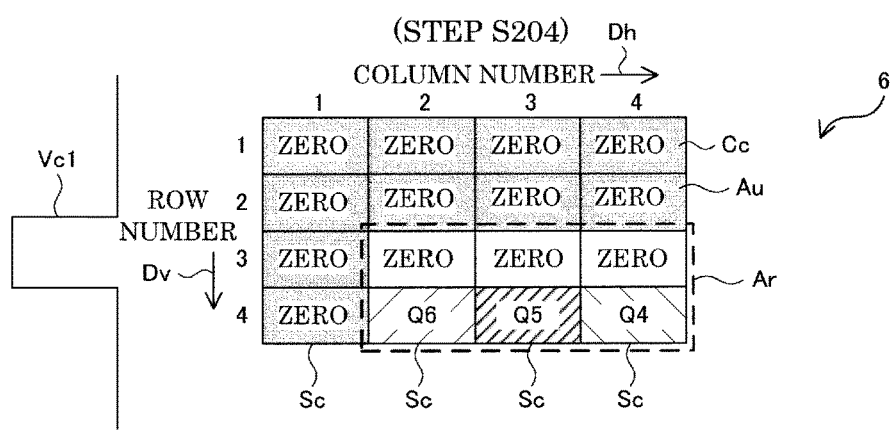
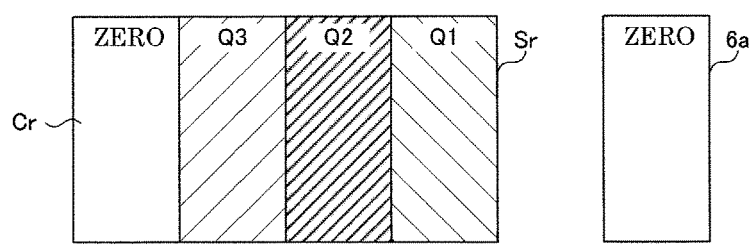

FIG. 14
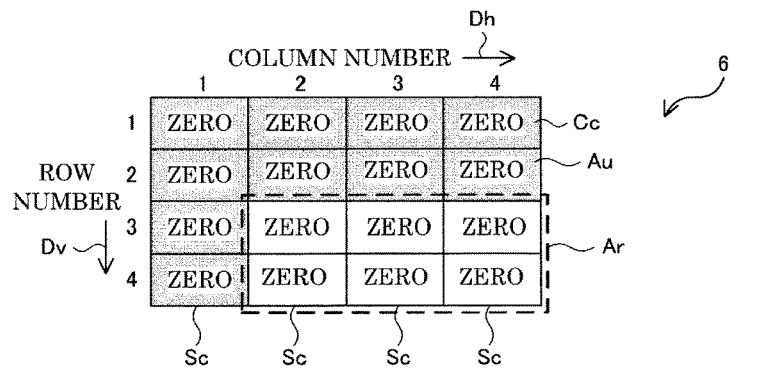
(STEP S210)
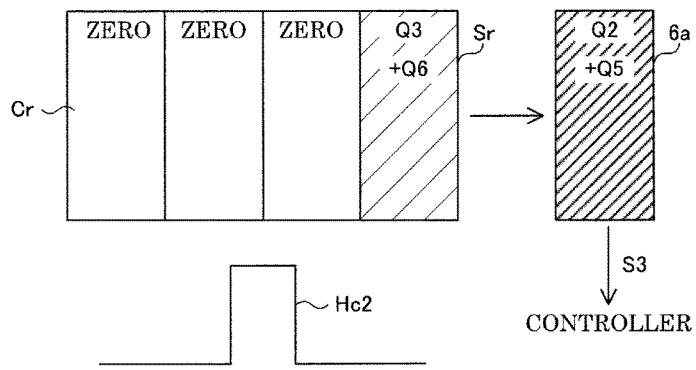
(STEP S212)
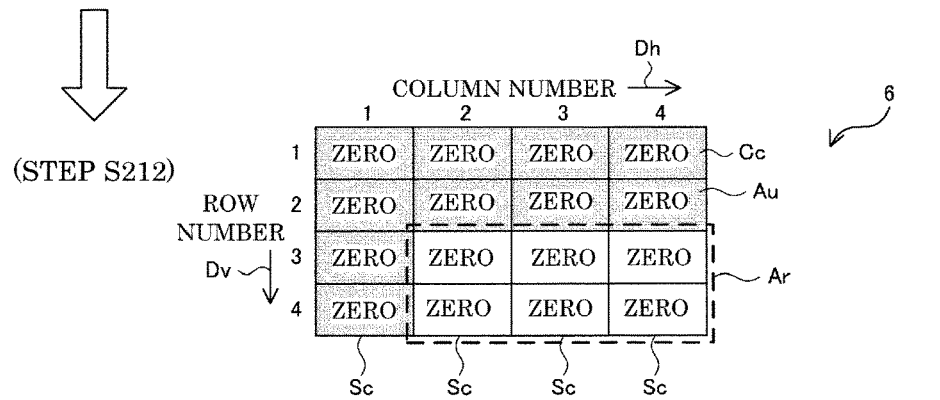
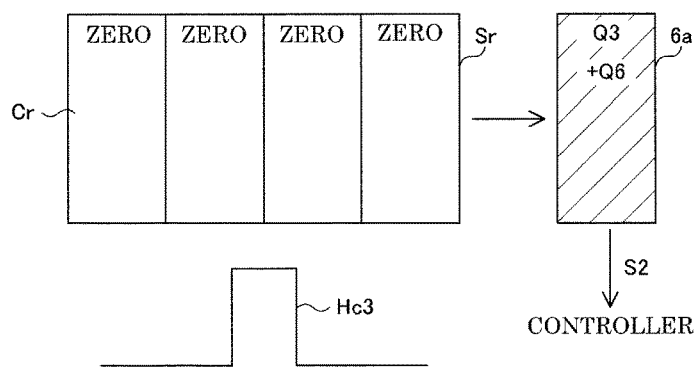

OPTICAL SPECTRUM MEASURING APPARATUS AND OPTICAL SPECTRUM MEASURING METHOD

CROSS-REFERENCE TO RELATED APPLICATION

This application is based upon and claims the benefit of priority from Japanese patent application No. 2017-20787, filed on Feb. 7, 2017, the disclosure of which are incorporated herein in its entirety by reference.

BACKGROUND OF THE INVENTION

Field of the Invention

The present invention relates to an optical spectrum measuring apparatus and an optical spectrum measuring method, and particularly to an optical spectrum measuring apparatus and an optical spectrum measuring method by which target light is split into rays.

Description of Related Art

"Wikipedia", [online], [searched on Jan. 4, 2017], Internet <URL: https://ja.wikipedia.org/wiki/%E5%88%86% E5%85%89% E5%99% A8> (Non-patent Document 1) discloses an overview of an optical spectrum measuring apparatus, which is an optical apparatus for measuring the electromagnetic spectrum of light. In recent years, optical spectrum measuring apparatuses for measuring the intensity of light for each wavelength have been developed.

Also, image capturing apparatuses in which a CCD (Charge Coupled Device) detector is employed as a light-receiving means have been developed. For example, JP 2010-266538A (Patent Document 1) discloses the following configuration. That is, the image capturing apparatus includes: a CCD image sensor that captures an image; a variable magnification lens and a lens driver that change the zoom magnification of the image; an operation unit that makes an instruction to change the zoom magnification; a feature detection unit that detects a feature portion from the image captured by the CCD image sensor; and a CPU that, upon an instruction to change the zoom magnification being made by the operation unit, compares the size of a feature portion detected by the feature detection unit, with a limit value of the size of a feature portion that can be detected by the feature detection unit, and controls the variable magnification lens and the lens driver according to the zoom magnification instructed by the operation unit, and the result of comparison.

SUMMARY OF THE INVENTION

For example, a configuration in which the CCD detector disclosed in Patent Document 1 and so on is employed as a light-receiving means of an optical spectrum measuring apparatus can be conceived of. There is demand for technology for providing a superior apparatus for measuring an optical spectrum, using such a configuration.

The present invention has been made in view of the above-described demand, and aims to provide a superior optical spectrum measuring apparatus and a superior optical spectrum measuring method.

(1) An optical spectrum measuring apparatus according to one aspect of the present invention includes: a CCD detector including a plurality of light-receiving devices that are two-dimensionally arranged; an optical system configured to split incident light into rays and irradiate the CCD detector with the rays; and a restriction unit configured to restrict one or more rows and/or one or more columns out of the rows and columns of the plurality of light-receiving devices from being irradiated with light from the optical system.

With such a configuration, a general-purpose CCD detector, for example, is restricted from being irradiated with light, and therefore it is possible to realize a CCD detector in which the detection area is downsized, without developing a new CCD detector, and consequently, it is possible to reduce the development costs of an apparatus. Also, since it is possible to reduce the number of rows and/or the number of columns to be irradiated with light, it is possible to reduce the time required to perform processing to acquire electrical charges generated in the light-receiving devices, compared to a configuration in which the area to be irradiated with light is not restricted. Therefore, it is possible to provide a superior optical spectrum measuring apparatus.

(2) Preferably, a restriction target that is to be restricted by the restriction unit is set based on a condition regarding spectrum measurement.

With such a configuration, it is possible to set an appropriate restriction target that matches the contents of an optical spectrum that is to be measured.

(3) More preferably, each of the rays, resulting from the splitting of light performed by the optical system and having different wavelengths, enters a column corresponding thereto, and the number of rows that are the restriction targets is set based on the time required for the CCD detector to measure one optical spectrum and/or the amount of light that is to be detected by the CCD detector.

With such a configuration, it is possible to complete measurement of an optical spectrum within a desired measurement time, or realize measurement of an optical spectrum that satisfies a desired S/N (Signal/Noise) ratio, for example.

(4) More preferably, each of the rays, resulting from the splitting of insident light performed by the optical system and having different wavelengths, enters a column corresponding thereto, and one or more columns other than a plurality of columns that respectively correspond to a plurality of wavelengths of an optical spectrum that is to be acquired by the optical spectrum measuring apparatus are set as the restriction targets.

With such a configuration, it is possible to efficiently measure an optical spectrum that has a desired wavelength range.

(5) Preferably, the optical system includes a light-collector unit that collects the rays resulting from the splitting of incident light, onto light-receiving devices that are not restricted by the restriction unit.

With such a configuration, it is possible to increase the intensity of light with which light-receiving devices that are to be used are irradiated, and therefore it is possible to improve the S/N ratio of the optical spectrum.

(6) Preferably, the CCD detector includes a plurality of column shift registers, each of which is provided for a column, and for each of which a plurality of column electrical charge accumulation devices are provided respectively in correspondence with the plurality of light-receiving devices that belong to the column, and a row shift register, for which a plurality of row electrical charge accumulation devices are provided respectively in correspondence with the column shift registers, and each column shift register transfers electrical charges accumulated in a column electrical charge accumulation device thereof corresponding to a light-receiving device that belongs to a row, to a column electrical charge accumulation device thereof corresponding to a light-receiving device that belongs to another row, or to a row electrical charge accumulation device corresponding thereto of the row shift register.

In this way, with the configuration for collecting, for each column, electrical charges generated by light-receiving devices irradiated with light, it is possible to efficiently acquire a desired amount of electrical charge for each wavelength.

(7) Preferably, the restriction unit restricts one or more rows and one or more columns out of the rows and columns from being irradiated with light from the optical system.

With such a configuration, it is possible to reduce both the number of rows and the number of columns to be irradiated with light, and therefore it is possible to further reduce the time required to acquire electrical charges generated in the light-receiving devices.

(8) An optical spectrum measuring method according to another aspect of the present invention is an optical spectrum measuring method that is employed in an optical spectrum measuring apparatus that is provided with a CCD detector including a plurality of light-receiving devices that are two-dimensionally arranged. The optical spectrum measuring method includes: a step of splitting incident light into rays and irradiating the CCD detector with the rays; and a step of acquiring electrical charges generated by the plurality of light-receiving devices using the rays with which the CCD detector is irradiated. In the step of irradiating the CCD detector with rays, one or more rows and/or one or more columns out of the rows and columns of the plurality of light-receiving devices are restricted from being irradiated with the rays resulting from the splitting of the incident light.

With such a method, a general-purpose CCD detector, for example, is restricted from being irradiated with light, and therefore it is possible to realize a CCD detector in which the detection area is downsized, without developing a new CCD detector, and consequently, it is possible to reduce the development costs of an apparatus. Also, since it is possible to reduce the number of rows and/or the number of columns to be irradiated with light, it is possible to reduce the time required to perform processing to acquire electrical charges generated in the light-receiving devices, compared to a configuration in which the area to be irradiated with light is not restricted. Therefore, it is possible to provide a superior optical spectrum measuring apparatus.

With the present invention, it is possible to provide a superior optical spectrum measuring apparatus and a superior optical spectrum measuring method.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows a comparative example for a method for reading out electrical charges accumulated in light-receiving devices of a CCD detector according to the embodiment of the present invention.

FIG. 12 shows a method for reading out electrical charges accumulated in the light-receiving devices of the CCD detector according to the embodiment of the present invention.

FIG. 14 shows the method for reading out electrical charges accumulated in the light-receiving devices of the CCD detector according to the embodiment of the present invention.

DETAILED DESCRIPTION OF THE INVENTION

Figure 1:
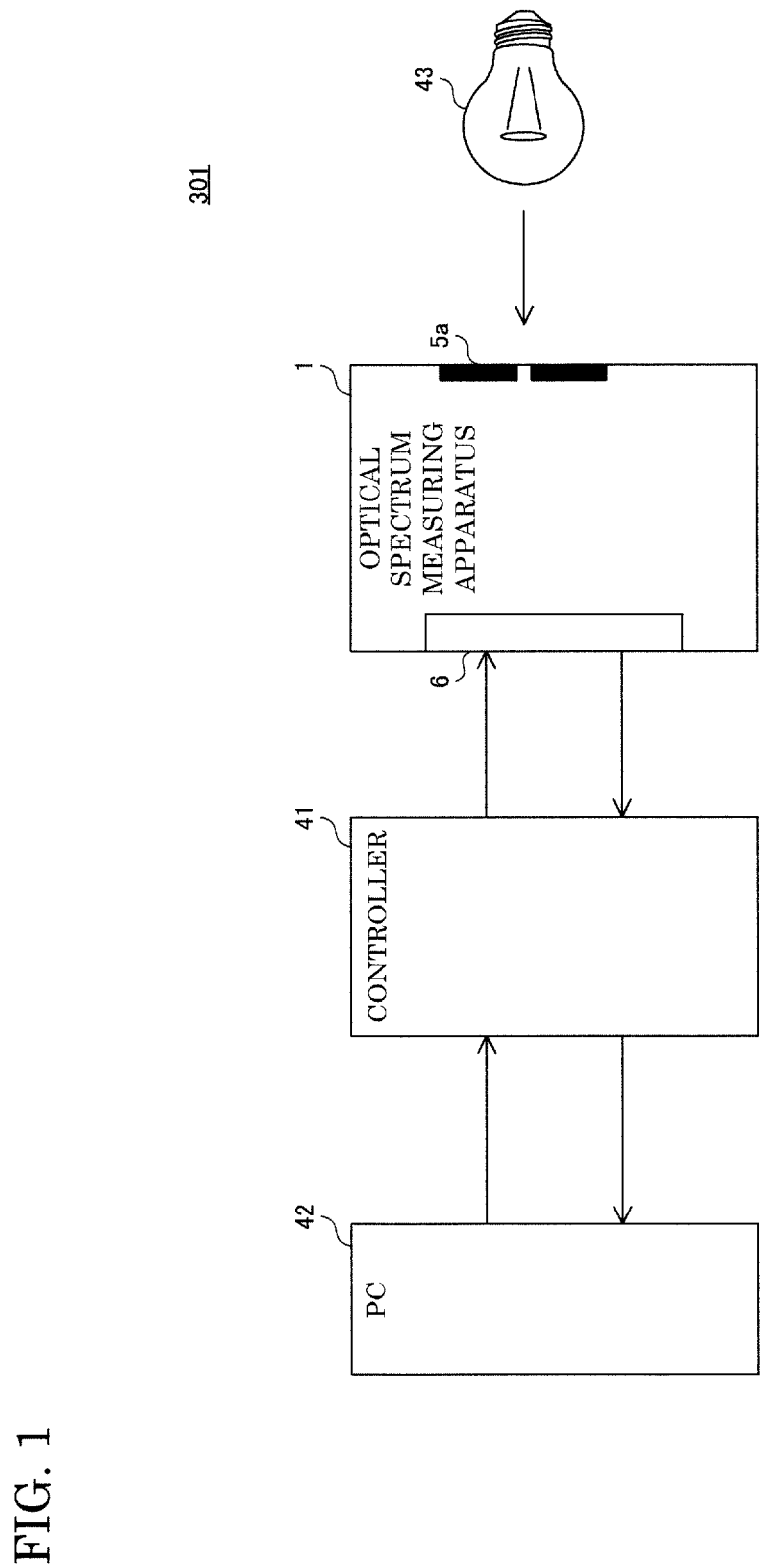
FIG. 1 shows a configuration of an optical spectrum measuring system that includes a comparative example for an optical spectrum measuring apparatus according to an embodiment of the present invention.

The following describes an embodiment of the present invention with reference to the drawings. Note that the same portions and equivalent portions in the drawings are assigned the same reference numerals and the descriptions thereof are not repeated. At least some portions of the embodiment below may be combined in any manner.

FIG. 1 shows a configuration of an optical spectrum measuring system that includes a comparative example for an optical spectrum measuring apparatus according to the embodiment of the present invention.

As shown in FIG. 1, an optical spectrum measuring system 301 includes: an optical spectrum measuring apparatus 1, which is a comparative example; a controller 41; and a personal computer (PC) 42.

A user installs, for example, an object 43, which is to be subjected to measurement performed by the optical spectrum measuring apparatus 1. The object 43 is, for example, a physical object that emits light by itself, such as a lighting apparatus or a display apparatus, or a physical object that reflects light emitted from a light source, or allows such light to pass therethrough.

The personal computer 42 can receive a user operation. For example, upon accepting a user operation performed to start measurement, the personal computer 42 transmits a measurement starting instruction to the controller 41 according to the accepted operation.

The controller 41 controls the optical spectrum measuring apparatus 1 according to the measurement starting instruction received from the personal computer 42, to acquire an optical spectrum that is based on the result of measurement performed by the optical spectrum measuring apparatus 1.

The controller 41 performs, for example, predetermined arithmetic processing on the optical spectrum thus acquired, to determine the quality of the object 43. The controller 41 transmits result information, which shows the result of determination, to the personal computer 42.

Upon receiving result information from the controller 41, the personal computer 42 displays the details of the result information thus received, on a display (not shown).

Although the controller 41 above is configured to transmit result information to the personal computer 42, the controller 41 is not limited to such a configuration. The controller 41 may be configured to transmit information that indicates an optical spectrum, to the personal computer 42.

Figure 2:
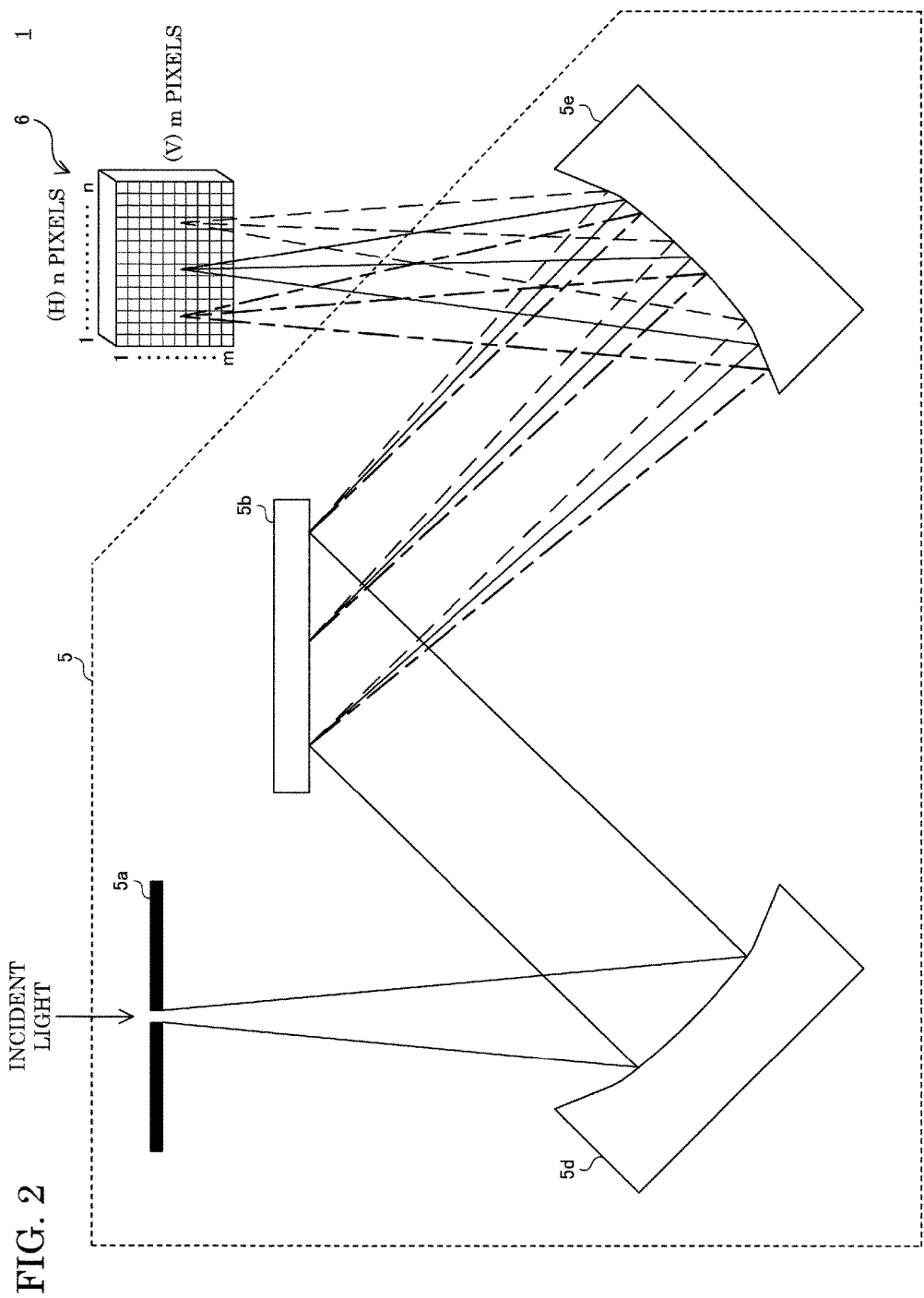
FIG. 2 shows a configuration of a comparative example for an optical spectrum measuring apparatus included in the optical spectrum measuring system according to the embodiment of the present invention.

FIG. 2 shows a configuration of a comparative example for the optical spectrum measuring apparatus included in the optical spectrum measuring system according to an embodiment of the present invention.

As shown in FIG. 2, the optical spectrum measuring apparatus 1 includes an optical system 5 and a CCD detector 6. The optical system 5 includes a slit 5a, a diffraction grating 5b, a collimating mirror 5d, and a focus mirror 5e.

As shown in FIGS. 1 and 2, the optical spectrum measuring apparatus 1 splits incident light from the object 43 into rays, thereby being able to measure an optical spectrum that shows the intensity of incident light for each wavelength. In particular, the optical spectrum measuring apparatus 1 is a Czerny-Turner spectrometer.

Specifically, the optical system 5 in the optical spectrum measuring apparatus 1 splits incident light into rays and irradiates the CCD detector 6 with the rays.

More specifically, the opening of the slit 5a in the optical system 5 has a rectangular shape and the long side thereof extends in a vertical direction, for example.

The collimating mirror 5d has, for example, a spherical reflective surface, and reflects incident light from the object 43, which has passed through the slit 5a, to convert the light into parallel rays, and irradiates the diffraction grating 5b with the parallel rays resulting from the conversion.

The diffraction grating 5b diffracts incident light from the collimating mirror 5d, into rays travelling in different directions, according to the wavelengths thereof.

More specifically, the diffraction grating 5b is, for example, a reflective diffraction grating, and grooves that extend in the vertical direction are provided in a reflective surface thereof. The diffraction grating 5b reflects incident light from the collimating mirror 5d so as to increase the intensity of each of the rays travelling in different directions according to the wavelengths thereof.

The focus mirror 5e has, for example, a spherical reflective surface, and reflects the incident light, which has been diffracted by the diffraction grating 5b, to collect the light onto the CCD detector 6.

The CCD detector 6 is, specifically, a CCD image sensor, and includes a plurality of light-receiving devices that are two-dimensionally arranged.

More specifically, the CCD detector 6 includes mxn light-receiving devices that are arranged in a matrix that has m rows and n columns. Here, the light-receiving devices belonging to the rows, and the light-receiving devices belonging to the columns, are respectively lined up in the vertical (V) direction and the horizontal (H) direction. m and n are integers greater than or equal to 2.

The CCD detector 6 is, for example, located such that each of the rays, resulting from the splitting of light performed by the optical system 5 and having different wavelengths, enters light-receiving devices that belong to a column corresponding thereto. Therefore, light-receiving devices that belong to the same column are irradiated with incident light with the same wavelength.

The light-receiving devices are, for example, photo diodes, and are reverse-biased by the controller 41 so that each light-receiving device generates and accumulates an electrical charge corresponding to the intensity of the received incident light.

The CCD detector 6 includes, for example, n column shift registers respectively provided for n columns, a row shift register, and an output unit. Each of the n column shift registers is provided with, for example, m column electrical charge accumulation devices corresponding to m light-receiving devices that belong to a column corresponding thereto. The row shift register is provided with n row electrical charge accumulation devices that respectively correspond to the column shift registers.

Comparative Examples of Binning Processing

FIGS. 3 to 7 show comparative examples for the method for reading out electrical charges accumulated in the light-receiving devices of the CCD detector according to the embodiment of the present invention.

For the sake of simplification, the example shown in FIG. 3 illustrates a method for reading out electrical charges from a CCD detector 6 that includes 4×4 light-receiving devices arranged in four rows and four columns.

The CCD detector 6 is, for example, an interline CCD or a frame transfer CCD.

The CCD detector 6 includes, for example, four column shift registers Sc, each of which is provided for a column, and for each of which four column electrical charge accumulation devices Cc are provided respectively in correspondence with four light-receiving devices that belong to the column, and a row shift register Sr, for which four row electrical charge accumulation devices Cr are provided respectively in correspondence with the column shift registers Sc, and an output unit 6a. The output unit 6a is, for example, an amplifier.

Note that the CCD detector 6 is not limited to an interline CCD or a frame transfer CCD, and may be a full-frame transfer CCD. If this is the case, in the CCD detector 6, four light-receiving devices that belong to a column also serve as four column electrical charge accumulation devices Cc.

The rows are assigned row numbers such that a row that is closer to the row shift register Sr is assigned a larger number. Also, the columns are assigned column numbers such that a column that is closer to the output unit 6a is assigned a larger number.

A direction that is parallel with the columns and faces toward the row shift register Sr is defined as a vertical transfer direction Dv. Similarly, a direction that is parallel with the rows and faces toward the output unit 6a is defined as a horizontal transfer direction Dh.

For example, each column shift register Sc transfers electrical charges accumulated in a column electrical charge accumulation device Cc thereof corresponding to a light-receiving device that belongs to a row, to a column electrical charge accumulation device Cc thereof corresponding to a light-receiving device that belongs to another row, or to a row electrical charge accumulation device Cr corresponding thereto of the row shift register Sr.

Specifically, first, upon a predetermined exposure time elapsing, the controller 41 performs concurrent transfer control to transfer an electrical charge accumulated in each light-receiving device to a column electrical charge accumulation device Cc corresponding thereto (step S102).

Here, sixteen column electrical charge accumulation devices Cc respectively accumulate electrical charges Q1 to Q16. Each light-receiving device generates and accumulates an electrical charge corresponding to the intensity of the received incident light, until the light-receiving device is newly subjected to concurrent transfer control performed by the controller 41 after the aforementioned exposure time has elapsed.

Next, the controller 41 provides each column shift register Sc with a vertical transfer signal Vc1 to shift the electrical charges accumulated in the column electrical charge accumulation devices Cc that each belong to a column, in a direction toward the row shift register Sr, i.e., in the vertical transfer direction Dv (step S104).

Here, the four row electrical charge accumulation devices Cr in the row shift register Sr respectively accumulate electrical charges Q4, Q3, Q2, and Q1 that have been transferred from the four column electrical charge accumulation devices Cc in the $4^{th}$ row.

Figure 4:
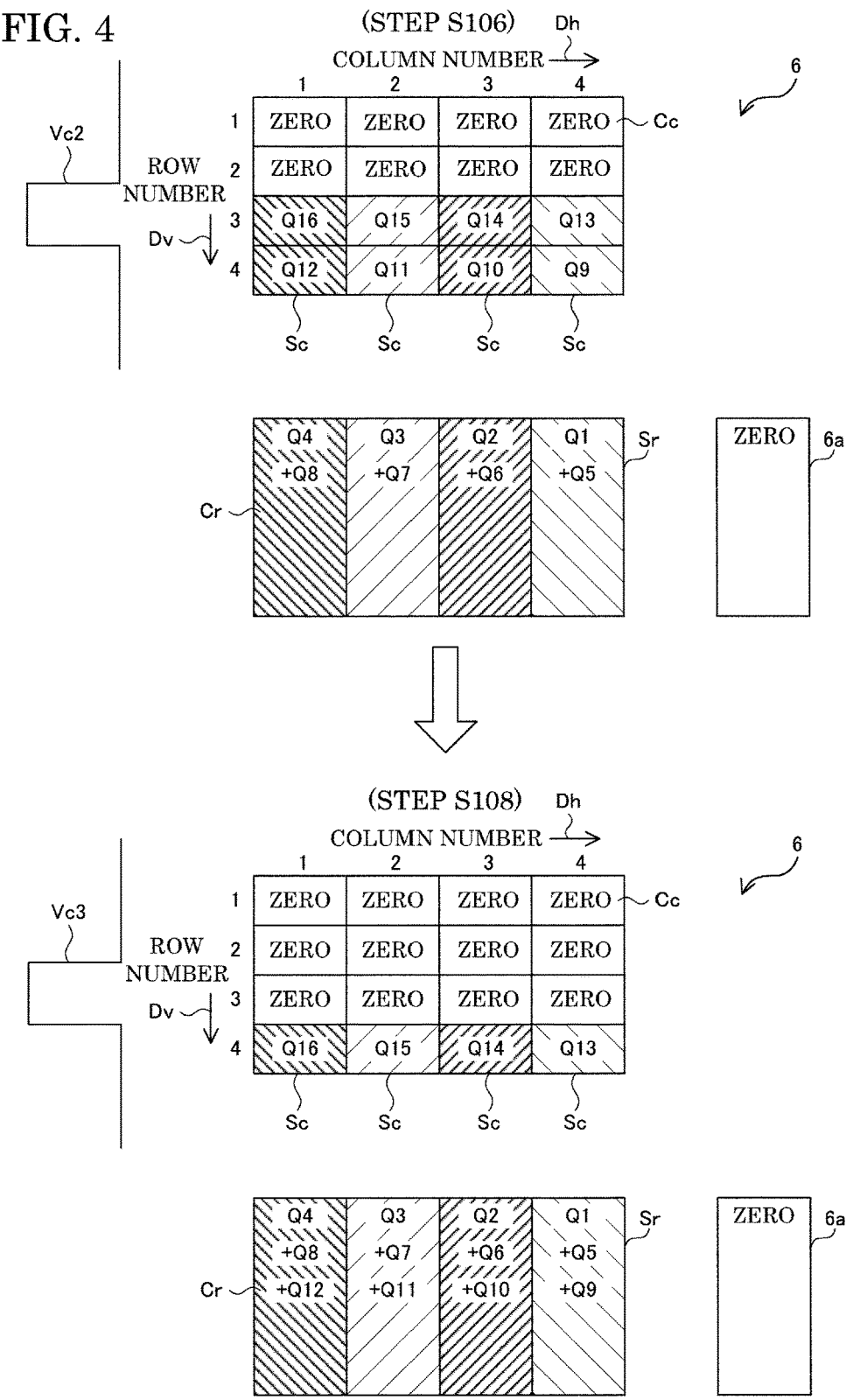
FIG. 4 shows a comparative example for the method for reading out electrical charges accumulated in the light-receiving devices of the CCD detector according to the embodiment of the present invention.

Next, as shown in FIG. 4, the controller 41 provides each column shift register Sc with a vertical transfer signal Vc2 to shift the electrical charges accumulated in the column electrical charge accumulation devices Cc that each belong to a column, in the direction toward the row shift register Sr (step S106).

Here, the four row electrical charge accumulation devices Cr in the row shift register Sr respectively accumulate electrical charges (Q4+Q8), (Q3+Q7), (Q2+Q6), and (Q1+Q5) by further accumulating the electrical charges that have been transferred from the four column electrical charge accumulation devices Cc in the 4th row.

Next, the controller 41 provides each column shift register Sc with a vertical transfer signal Vc3 to shift the electrical charges accumulated in the column electrical charge accumulation devices Cc that each belong to a column, in the direction toward the row shift register Sr (step S108).

Here, the four row electrical charge accumulation devices Cr in the row shift register Sr respectively accumulate electrical charges (Q4+Q8+Q12), (Q3+Q7+Q11), (Q2+Q6+Q10), and (Q1+Q5+Q9) by further accumulating the electrical charges that have been transferred from the four column electrical charge accumulation devices Cc in the $4^{th}$ row.

Figure 5:
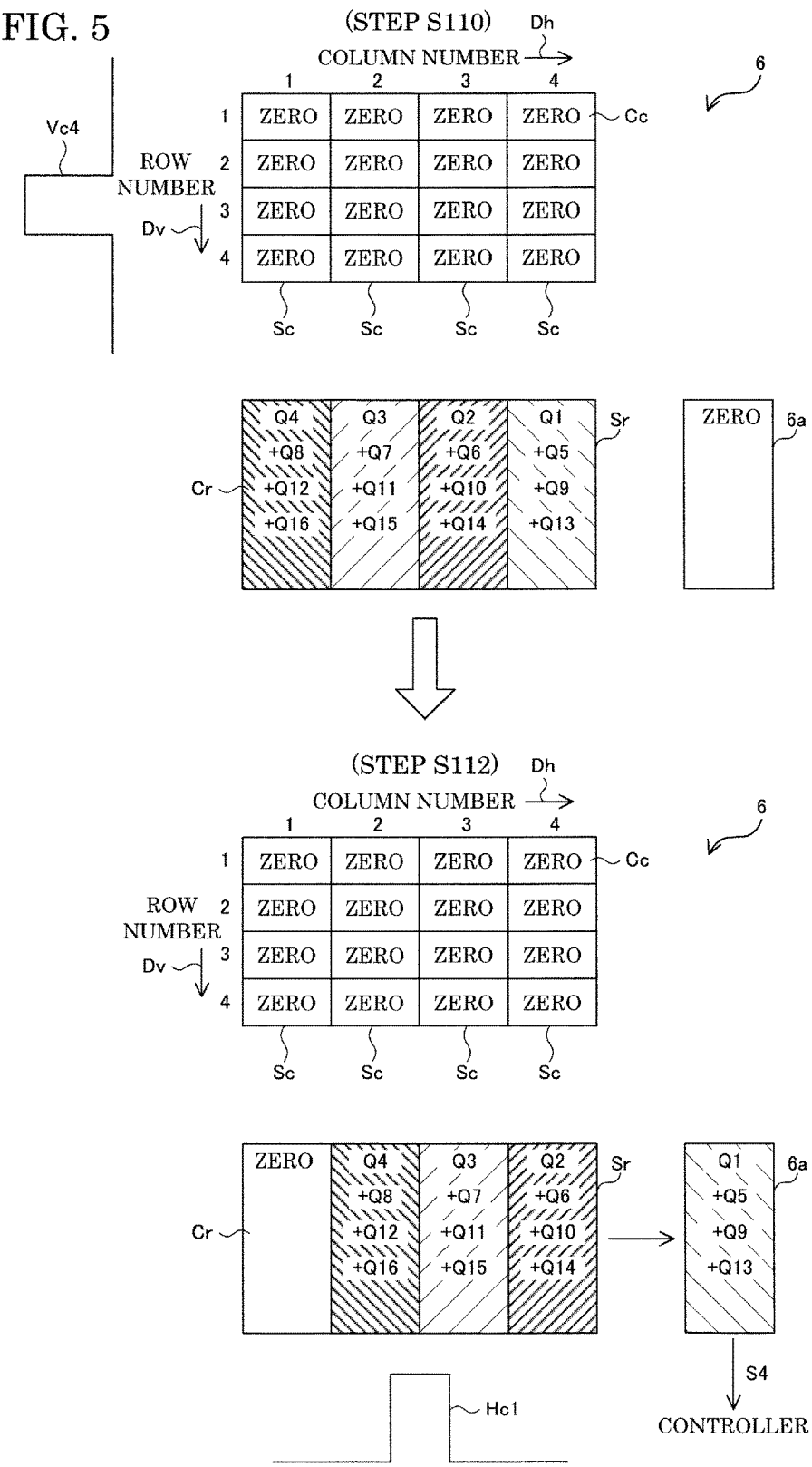
FIG. 5 shows a comparative example for the method for reading out electrical charges accumulated in the light-receiving devices of the CCD detector according to the embodiment of the present invention.

Next, as shown in FIG. 5, the controller 41 provides each column shift register Sc with a vertical transfer signal Vc4 to shift the electrical charges accumulated in the column electrical charge accumulation devices Cc that each belong to a column, in the direction toward the row shift register Sr (step S110).

Here, the four row electrical charge accumulation devices Cr in the row shift register Sr respectively accumulate electrical charges (Q4+Q8+Q12+Q16), (Q3+Q7+Q11+Q15), (Q2+Q6+Q10+Q14), and (Q1+Q5+Q9+Q13) by further accumulating the electrical charges that have been transferred from the four column electrical charge accumulation devices Cc in the $4^{th}$ row.

Next, the controller 41 provides the row shift register Sr with a horizontal transfer signal Hc1 to shift the electrical charges accumulated in the row electrical charge accumulation devices Cr that belong to the row shift register Sr, in a direction toward the output unit 6a, i.e., in the horizontal transfer direction Dh (step S112).

Here, the electrical charge (Q1+Q5+Q9+Q13) accumulated in the row electrical charge accumulation device Cr corresponding to the column shift register Sc for the $4^{th}$ column is transferred to the output unit 6a. The output unit 6a outputs a component signal S4 that is at a level corresponding to the accumulated electrical charge (Q1+Q5+Q9+Q13), to the controller 41.

Figure 6:
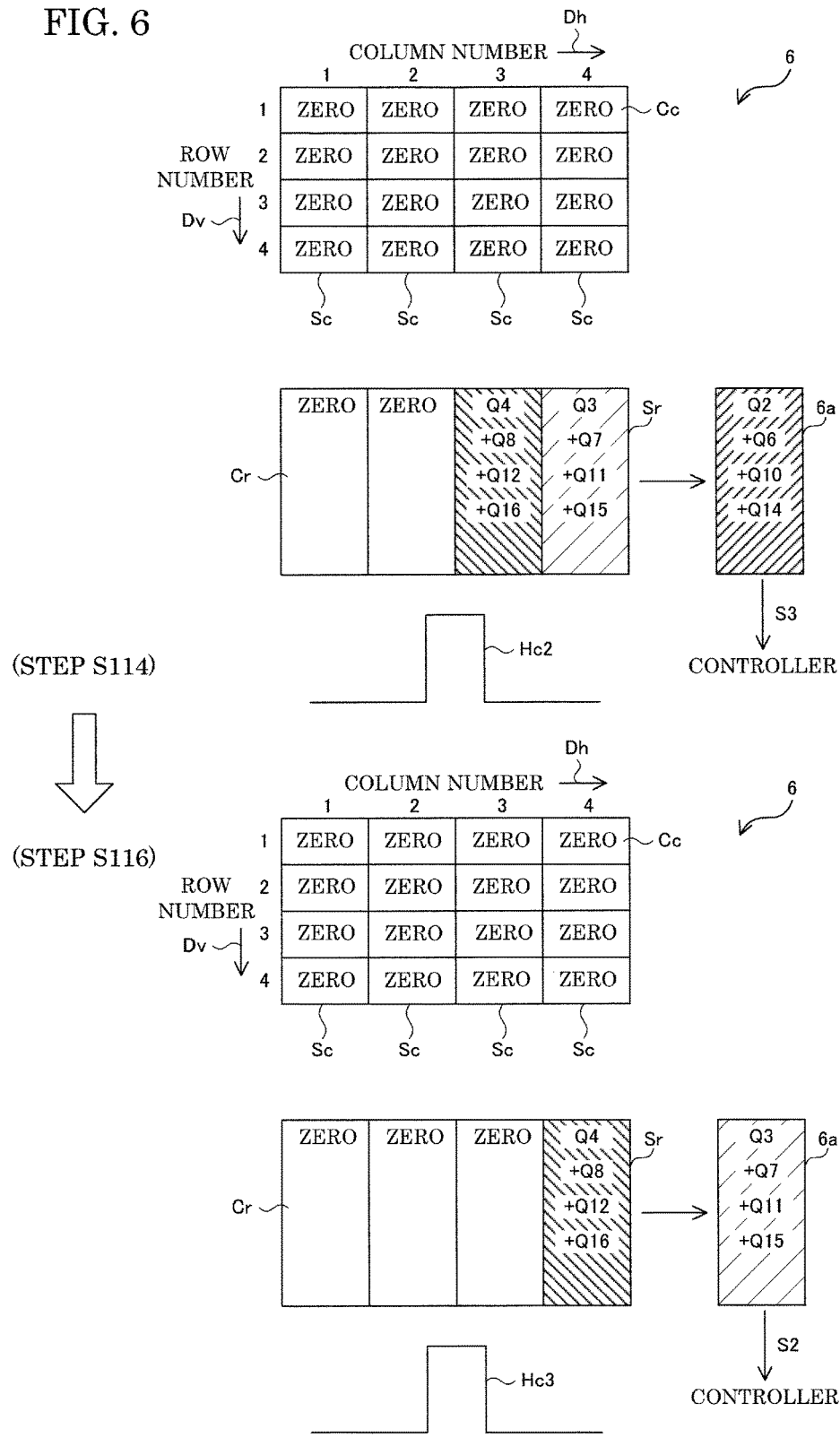
FIG. 6 shows a comparative example for the method for reading out electrical charges accumulated in the light-receiving devices of the CCD detector according to the embodiment of the present invention.

Next, as shown in FIG. 6, the controller 41 provides the row shift register Sr with a horizontal transfer signal Hc2 to shift the electrical charges accumulated in the row electrical charge accumulation devices Cr that belong to the row shift register Sr, in the direction toward the output unit 6a (step S114).

Here, the electrical charge (Q2+Q6+Q10+Q14) accumulated in the row electrical charge accumulation device Cr corresponding to the column shift register Sc for the $4^{th}$ column is transferred to the output unit 6a. The output unit 6a outputs a component signal S3 that is at a level corresponding to the accumulated electrical charge (Q2+Q6+Q10+Q14), to the controller 41.

Next, the controller 41 provides the row shift register Sr with a horizontal transfer signal Hc3 to shift the electrical charges accumulated in the row electrical charge accumulation devices Cr that belong to the row shift register Sr, in the direction toward the output unit 6a (step S116).

Here, the electrical charge (Q3+Q7+Q11+Q15) accumulated in the row electrical charge accumulation device Cr corresponding to the column shift register Sc for the $4^{th}$ column is transferred to the output unit 6a. The output unit 6a outputs a component signal S2 that is at a level corresponding to the accumulated electrical charge (Q3+Q7+Q11+Q15), to the controller 41.

Figure 7:
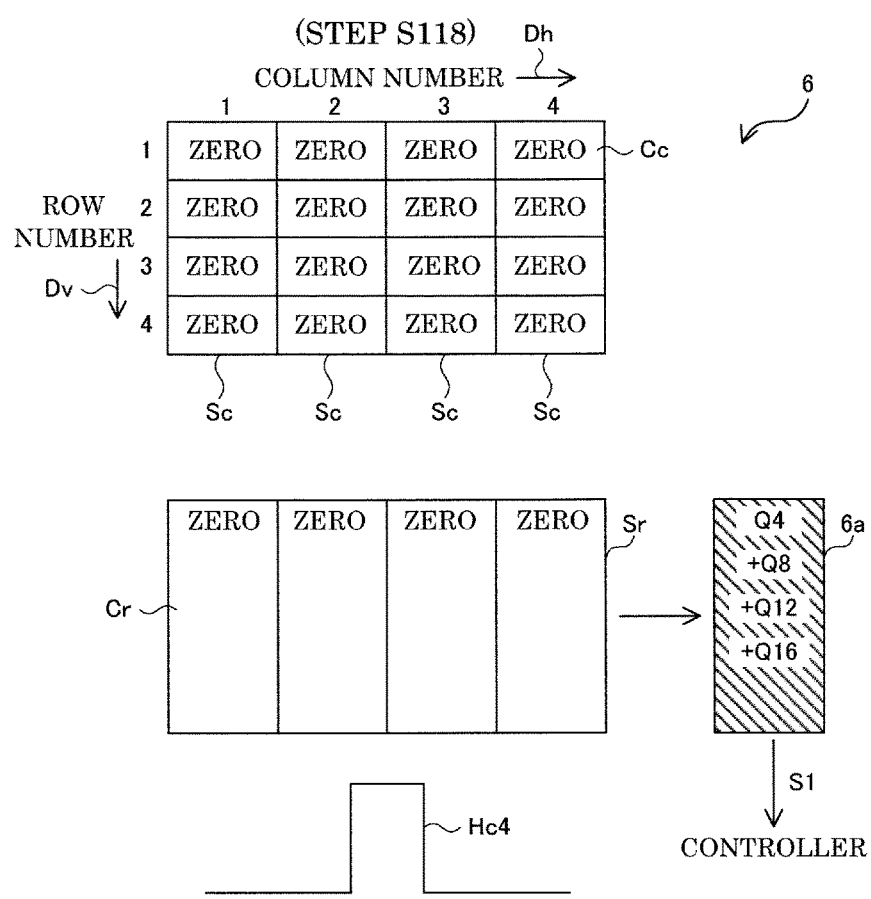
FIG. 7 shows a comparative example for the method for reading out electrical charges accumulated in the light-receiving devices of the CCD detector according to the embodiment of the present invention.

Next, as shown in FIG. 7, the controller 41 provides the row shift register Sr with a horizontal transfer signal Hc4 to shift the electrical charges accumulated in the row electrical charge accumulation devices Cr that belong to the row shift register Sr, in the direction toward the output unit 6a (step S118).

Here, the electrical charge (Q4+Q8+Q12+Q16) accumulated in the row electrical charge accumulation device Cr corresponding to the column shift register Sc for the 4$^{th}$ column is transferred to the output unit 6a. The output unit 6a outputs a component signal S1 that is at a level corresponding to the accumulated electrical charge (Q4+Q8+Q12+Q16), to the controller 41.

Based on the component signals S4 to S1 received from the output unit 6a, the controller 41 acquires an optical spectrum that shows the intensity of light for each wavelength.

Problem

One optical spectrum is measured by performing the above-described steps S102 to S118, and there is demand for a reduction in the time required to measure one optical spectrum (hereinafter also referred to as "unit measurement time").

For example, it is possible to conceive of a method that employs a CCD detector 6 that includes fewer rows. However, if a CCD detector 6 with an appropriate number of rows is not commercially available, a new CCD detector 6 needs to be developed, which increases costs.

If a CCD detector 6 with fewer rows than an appropriate number of rows is used, the unit measurement time can be reduced. However, the total amount of electrical charge accumulated in the plurality of column electrical charge accumulation devices Cc in each column decreases, which reduces the S/N ratio.

That is, there is demand for technology that makes it possible to reduce the unit measurement time and maintain the S/N ratio at a certain level, using a general-purpose CCD detector without developing a new CCD detector.

Therefore, the optical spectrum measuring system according to the embodiment of the present invention solves such a problem by means of the following configuration and operations.

Configuration of Optical Spectrum Measuring Apparatus

Figure 8:
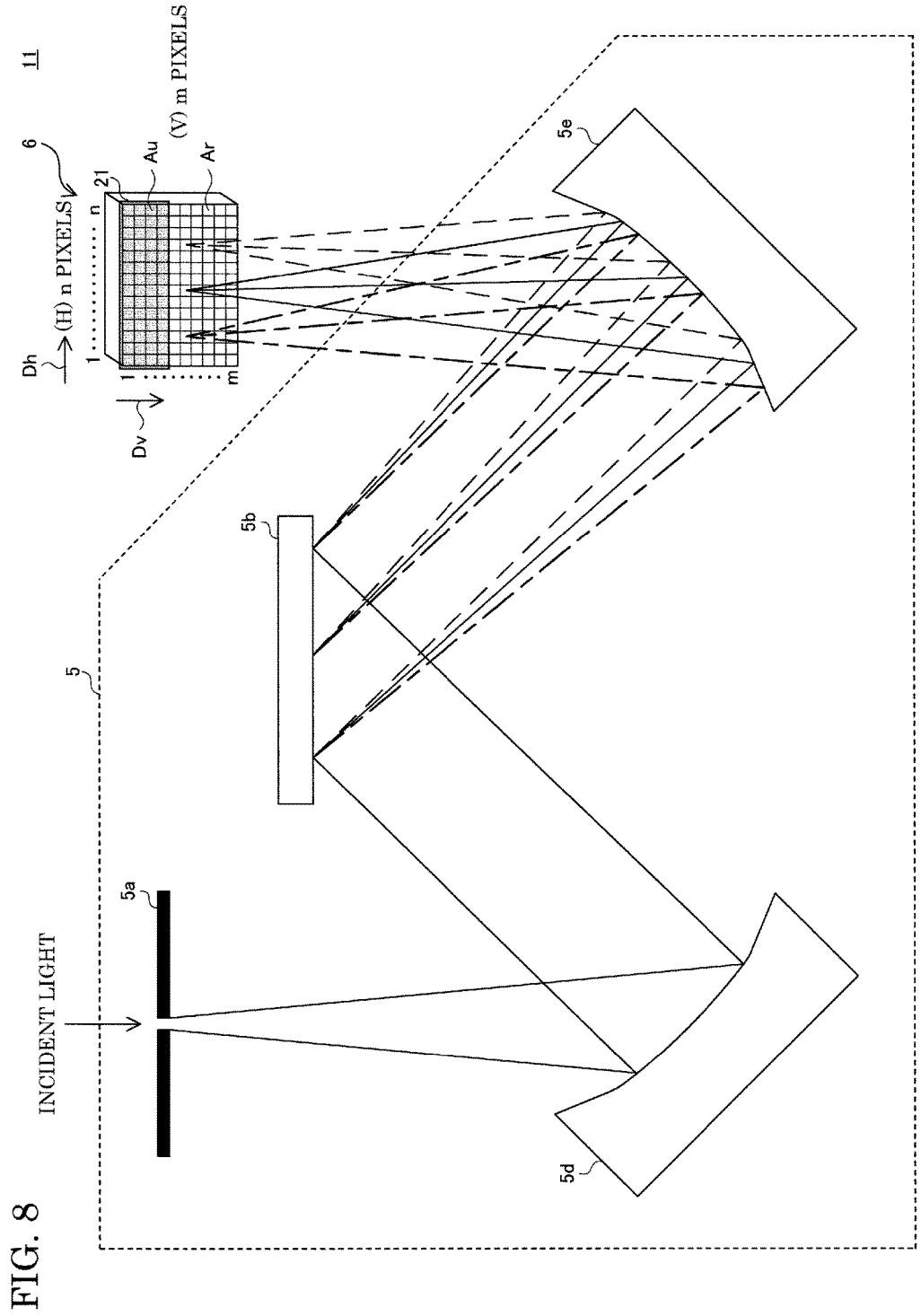
FIG. 8 shows a configuration of the optical spectrum measuring apparatus included in the optical spectrum measuring system according to the embodiment of the present invention.

FIG. 8 shows a configuration of the optical spectrum measuring apparatus included in the optical spectrum measuring system according to the embodiment of the present invention.

As shown in FIG. 8, an optical spectrum measuring system 301 includes an optical spectrum measuring apparatus 11 instead of the optical spectrum measuring apparatus 1 shown in FIG. 1. The optical spectrum measuring apparatus 11 includes the optical system 5, the CCD detector 6, and a restriction unit (restriction mechanism) 21.

The configurations and operations of the optical system 5 and the CCD detector 6 in the optical spectrum measuring apparatus 11 are respectively the same as those of the optical system 5 and the CCD detector 6 in the optical spectrum measuring apparatus 1 shown in FIG. 2. The CCD detector 6 is, for example, a general-purpose product.

Figure 9:
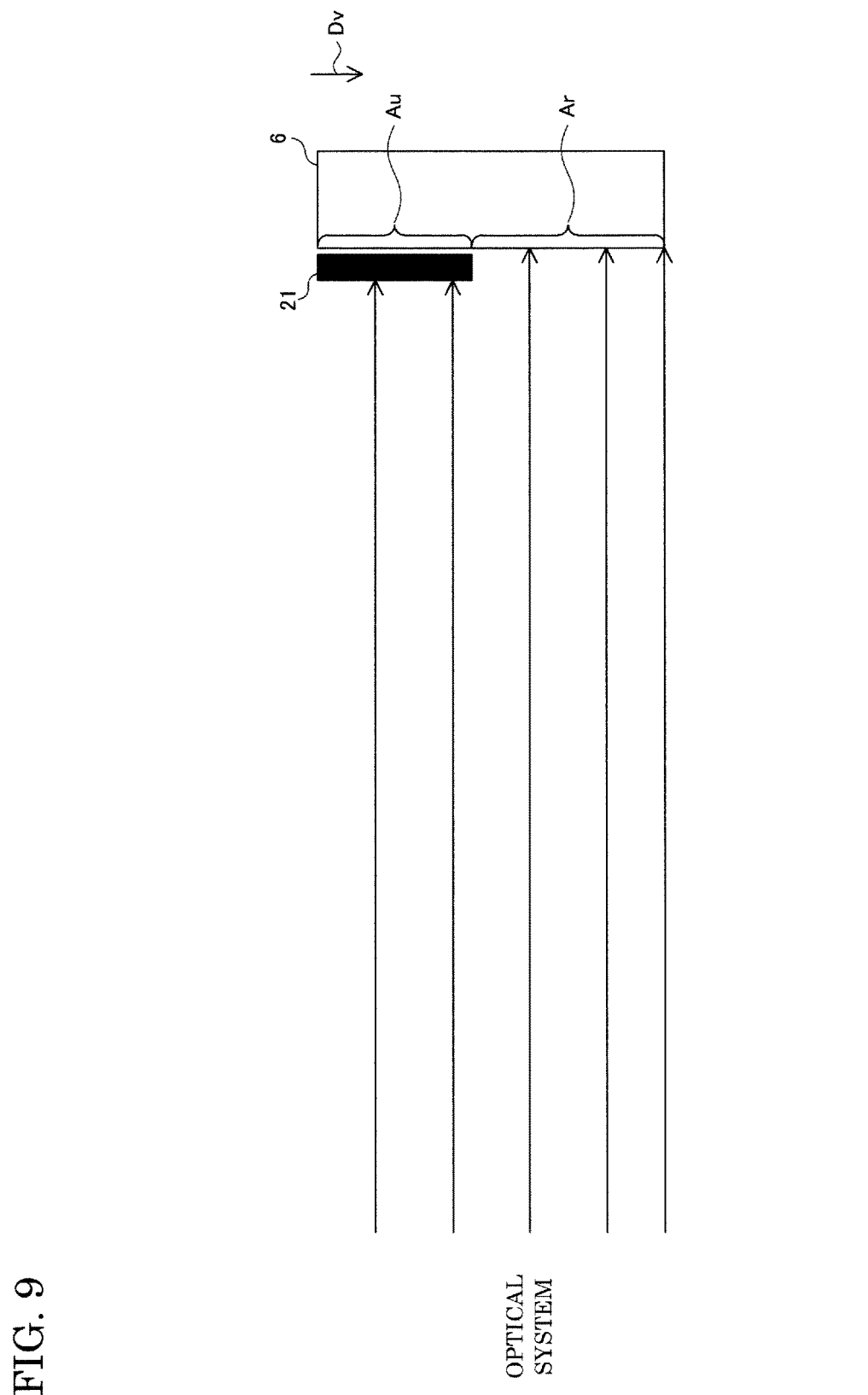
FIG. 9 is a side view in which the CCD detector provided in the optical spectrum measuring apparatus according to the embodiment of the present invention is viewed in a horizontal transfer direction.

FIG. 9 is a side view in which the CCD detector provided in the optical spectrum measuring apparatus according to the embodiment of the present invention is viewed in the horizontal transfer direction.

As shown in FIGS. 8 and 9, for example, the restriction unit 21 restricts one or more rows out of the rows of light-receiving devices from being irritated with light from the optical system 5.

Specifically, the restriction unit 21 is a masking member, for example. The restriction unit 21 is not light-transmissive with respect to a wavelength band to which the light-receiving devices in the CCD detector 6 are sensitive. To facilitate understanding, the restriction unit 21 shown in FIG. 8 is translucent.

The restriction unit 21 is made of metal or resin, for example. The restriction unit 21 is provided on an area (hereinafter also referred to as "restriction-target area") Au of the light-receiving surface of the CCD detector 6, which is to be restricted from being irradiated with light from the optical system 5. In other words, the restriction unit 21 is provided on an area other than an area (hereinafter referred to as "irradiation-target area") Ar that is to be irradiated with light from the optical system 5, out of the light-receiving surface of the CCD detector 6.

For example, the restriction unit 21 reflects the light from the optical system 5 to restrict an area of the CCD detector 6 from being irradiated with light from the optical system 5.

However, since the light reflected by the restriction unit 21 becomes stray light within the optical spectrum measuring apparatus 11, it is preferable to employ a configuration in which the restriction unit 21 absorbs light from the optical system 5 to restrict the CCD detector 6 from being irradiated with light from the optical system 5.

The restriction targets, which are to be restricted by the restriction unit 21, are set based on conditions regarding spectrum measurement, for example.

More specifically, for example, the number of restriction-target rows of the CCD detector 6 is set based on the time required for the CCD detector 6 to measure one optical spectrum, i.e. the unit measurement time.

Specifically, the number of rows of the CCD detector 6 is set such that the unit measurement time is shorter than the time required to meet specifications. The number of restriction-target rows may be one or more.

The restriction-target area Au is provided so as to include the first row, i.e. the 1$^{st}$ row, from a starting point in the vertical transfer direction Dv.

The restriction-target area Au may be divided into a plurality of areas. If this is the case, one area divided from the restriction-target area Au is provided so as to include the 1$^{st}$ row.

First Modification of Restriction Unit 21

Figure 10:
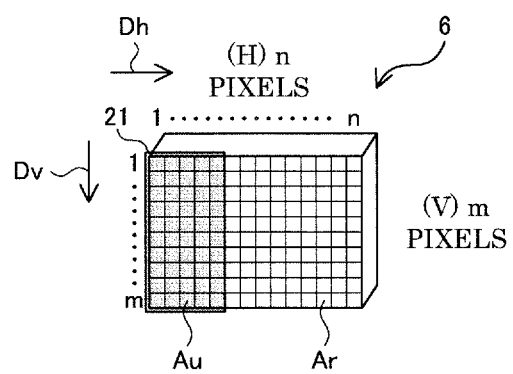
FIG. 10 shows a configuration of a modification of a restriction unit provided in the optical spectrum measuring apparatus according to the embodiment of the present invention.

FIG. 10 shows a configuration of a modification of the restriction unit provided in the optical spectrum measuring apparatus according to the embodiment of the present invention. To facilitate understanding, the restriction unit 21 shown in FIG. 10 is translucent.

The first modification of the restriction unit 21 restricts, for example, one or more columns out of the columns of light-receiving devices from being irradiated with light from the optical system 5.

For example, one or more columns other than a plurality of columns that respectively correspond to a plurality of wavelengths of an optical spectrum that is to be acquired by the optical spectrum measuring apparatus 11 are set as restriction targets.

Specifically, one or more columns other than a plurality of columns that respectively correspond to a plurality of wavelengths that are required to meet specifications are set as restriction targets. The number of restriction-target columns may be one or more.

The restriction-target area Au is provided so as to include the first column, i.e. the 1$^{st}$ column, from a starting point in the horizontal transfer direction Dh.

The restriction-target area Au may be divided into a plurality of areas. If this is the case, one area divided from the restriction-target area Au is provided so as to include the $1^{st}$ column.

Second Modification of Restriction Unit 21

Figure 11:
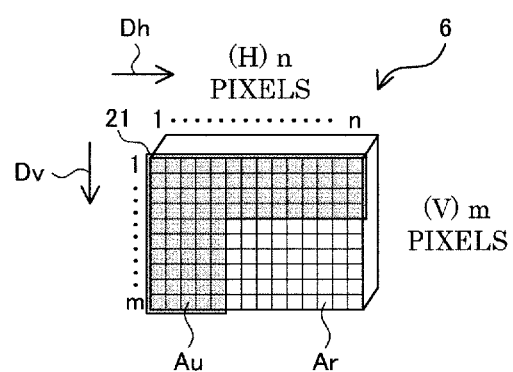
FIG. 11 shows a configuration of a modification of the restriction unit provided in the optical spectrum measuring apparatus according to the embodiment of the present invention.

FIG. 11 shows a configuration of a modification of the restriction unit provided in the optical spectrum measuring apparatus according to the embodiment of the present invention. To facilitate understanding, the restriction unit 21 shown in FIG. 11 is translucent.

The second modification of the restriction unit 21 restricts, for example, one or more rows and one or more columns out of the rows and columns of the plurality of light-receiving devices from being irradiated with light from the optical system 5.

For example, one or more columns other than a plurality of columns that respectively correspond to a plurality of wavelengths of an optical spectrum that is to be acquired by the optical spectrum measuring apparatus 11 are set as restriction targets.

Specifically, the restriction-target area Au shown in FIG. 11 is set using the setting method shown in FIG. 8 regarding the row direction, and is set using the setting method shown in FIG. 10 regarding the column direction, for example.

Binning Processing

Figure 13:
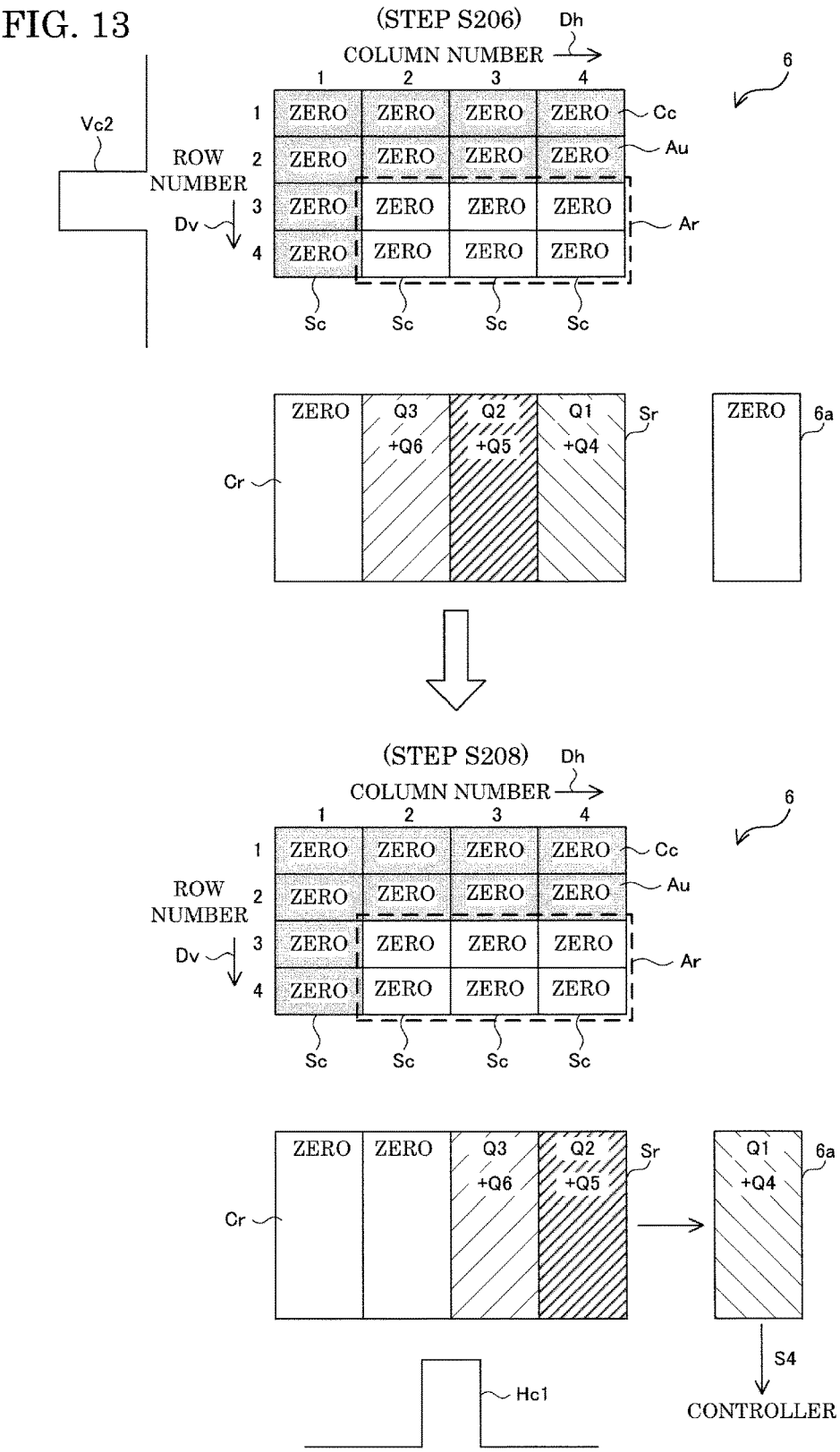
FIG. 13 shows the method for reading out electrical charges accumulated in the light-receiving devices of the CCD detector according to the embodiment of the present invention.

FIGS. 12 to 14 show a method for reading out electrical charges accumulated in the light-receiving devices of the CCD detector according to the embodiment of the present invention.

The CCD detector 6 shown in FIG. 12 is the same as the CCD detector 6 shown in FIG. 3. The CCD detector 6 shown in FIG. 12 is provided with the restriction unit 21 that has the same shape as the second modification of the restriction unit 21 shown in FIG. 11. In this example, the targets to be restricted by the restriction unit 21 are the $1^{st}$ row, the $2^{nd}$ row, and the $1^{st}$ column.

For example, each column shift register Sc transfers an electrical charge accumulated in a column electrical charge accumulation device Cc thereof corresponding to a light-receiving device that is included in an irradiation-target area Ar and belongs to a row, to a column electrical charge accumulation device Cc thereof corresponding to a light-receiving device that belongs to another row, or to a row electrical charge accumulation device Cr corresponding thereto of the row shift register Sr.

Specifically, first, upon a predetermined exposure time elapsing, the controller 41 performs concurrent transfer control to transfer an electrical charge accumulated in each light-receiving device to a column electrical charge accumulation device Cc corresponding thereto (step S202).

Here, six column electrical charge accumulation devices Cc in the irradiation-target area Ar respectively accumulate electrical charges Q1 to Q6.

Next, the controller 41 provides each column shift register Sc with a vertical transfer signal Vc1 to shift the electrical charges accumulated in the column electrical charge accumulation devices Cc that each belong to a column, in the direction toward the row shift register Sr (step S204).

Here, since the column electrical charge accumulation devices Cc in the $1^{st}$ column included in the restriction-target area Au do not accumulate electrical charges, the four row electrical charge accumulation devices Cr in the row shift register Sr respectively accumulate charges zero, Q3, Q2, and Q1 that are based on the four column electrical charge accumulation devices Cc in the $4^{th}$ row.

Next, as shown in FIG. 13, the controller 41 provides each column shift register Sc with a vertical transfer signal Vc2 to shift the electrical charges accumulated in the column electrical charge accumulation devices Cc that each belong to a column, in the direction toward the row shift register Sr (step S206).

Here, the four row electrical charge accumulation devices Cr in the row shift register Sr respectively accumulate electrical charges zero, (Q3+Q6), (Q2+Q5), and (Q1+Q4) by further accumulating the electrical charges that are based on the four column electrical charge accumulation devices Cc in the $4^{th}$ row.

Next, the controller 41 provides the row shift register Sr with a horizontal transfer signal Hc1 to shift the electrical charges accumulated in the row electrical charge accumulation devices Cr that belong to the row shift register Sr, in the direction toward the output unit 6a (step S208).

Here, the electrical charge (Q1+Q4) accumulated in the row electrical charge accumulation device Cr corresponding to the column shift register Sc for the $4^{th}$ column is transferred to the output unit 6a. The output unit 6a outputs a component signal S4 that is at a level corresponding to the accumulated electrical charge (Q1+Q4), to the controller 41.

Next, as shown in FIG. 14, the controller 41 provides the row shift register Sr with a horizontal transfer signal Hc2 to shift the electrical charges accumulated in the row electrical charge accumulation devices Cr that belong to the row shift register Sr, in the direction toward the output unit 6a (step S210).

Here, the electrical charge (Q2+Q5) accumulated in the row electrical charge accumulation device Cr corresponding to the column shift register Sc for the $4^{th}$ column is transferred to the output unit 6a. The output unit 6a outputs a component signal S3 that is at a level corresponding to the accumulated electrical charge (Q2+Q5), to the controller 41.

Next, the controller 41 provides the row shift register Sr with a horizontal transfer signal Hc3 to shift the electrical charges accumulated in the row electrical charge accumulation devices Cr that belong to the row shift register Sr, in the direction toward the output unit 6a (step S212).

Here, the electrical charge (Q3+Q6) accumulated in the row electrical charge accumulation device Cr corresponding to the column shift register Sc for the $4^{th}$ column is transferred to the output unit 6a. The output unit 6a outputs a component signal S2 that is at a level corresponding to the accumulated electrical charge (Q3+Q6), to the controller 41.

Based on the component signals S4 to S2 received from the output unit 6a, the controller 41 acquires an optical spectrum that shows the intensity of light for each wavelength.

Figure 15:
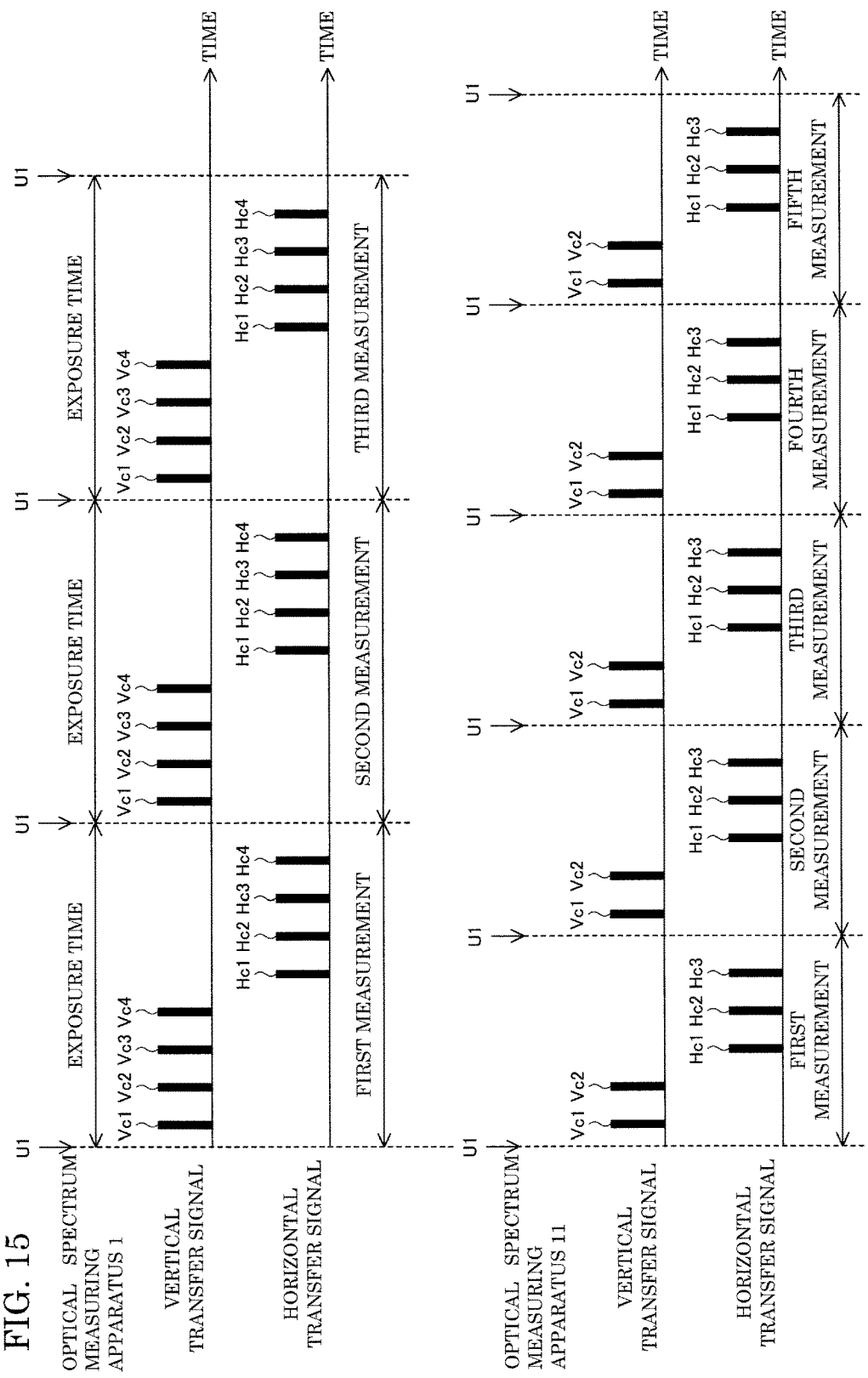
FIG. 15 illustrates effects of the optical spectrum measuring system according to the embodiment of the present invention.

FIG. 15 illustrates effects of the optical spectrum measuring system according to the embodiment of the present invention.

As shown in FIG. 15, in the optical spectrum measuring apparatus 1, which is a comparative example, the CCD detector 6 is subjected to concurrent transfer control U1 performed by the controller 41, and thereafter sequentially receives the vertical transfer signals Vc1 to Vc4 and the horizontal transfer signals Hc1 to Hc4 from the controller 41, as shown in FIGS. 3 to 7. The CCD detector 6 transmits the component signals S4 to S1 to the controller 41 in response to the horizontal transfer signals Hc1 to Hc4, respectively, and thus the controller 41 completes the acquisition of one optical spectrum.

In contrast, in the optical spectrum measuring apparatus 11, the CCD detector 6 is subjected to the concurrent transfer control U1 performed by the controller 41, and thereafter sequentially receives the vertical transfer signals Vc1 and Vc2 and the horizontal transfer signals Hc1 and Hc3 from the controller 41, as shown in FIGS. 12 to 14. The CCD detector 6 transmits the component signals S4 to S2 to the controller 41 in response to the horizontal transfer signals Hc1 to Hc3, respectively, and thus the controller 41 completes the acquisition of one optical spectrum.

In this way, the optical spectrum measuring apparatus 11 is configured such that electrical charges accumulated in the irradiation-target area Ar are to be transferred, and thus the number of times electrical charges are transferred in the vertical transfer direction Dv and the horizontal transfer direction Dh can be reduced. Therefore, it is possible to reduce the unit measurement time to be shorter than the unit measurement time of the optical spectrum measuring apparatus 1.

Modification of Optical System 5

Figure 16:
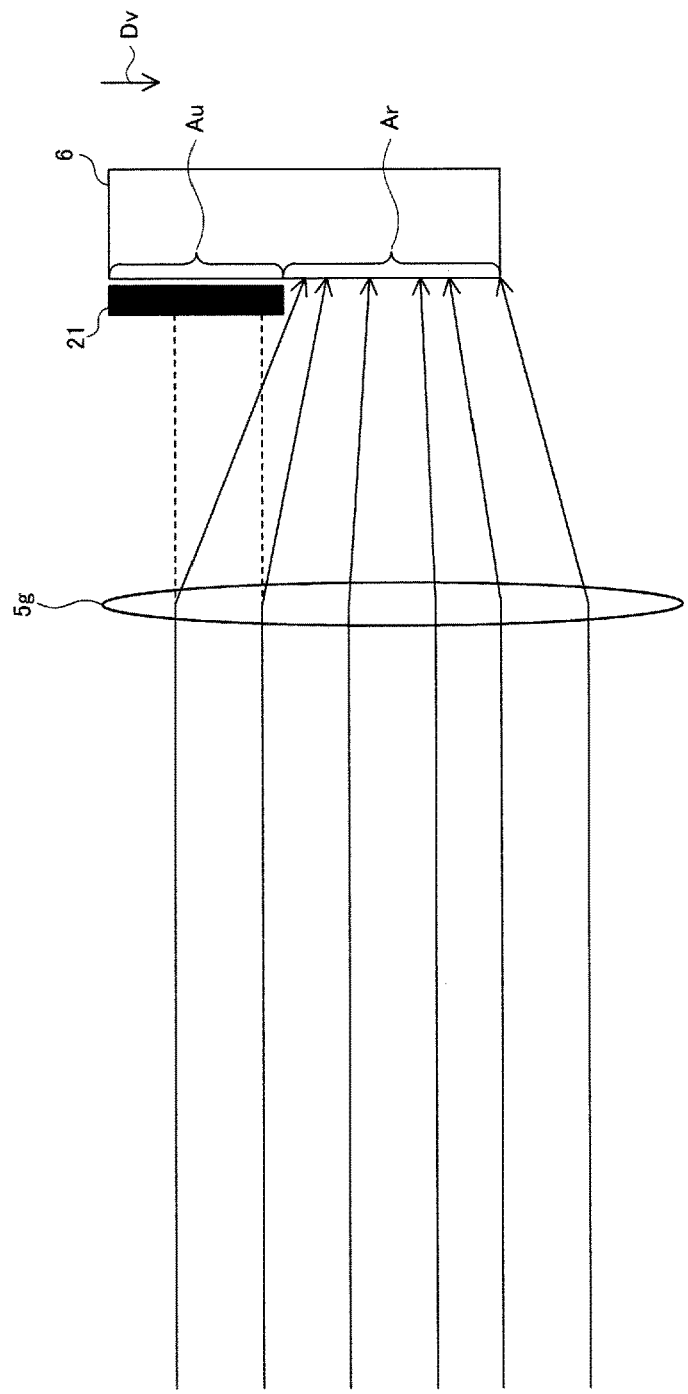
FIG. 16 shows a configuration of a modification of an optical system in the optical spectrum measuring apparatus according to the embodiment of the present invention.

FIG. 16 shows a configuration of a modification of the optical system in the optical spectrum measuring apparatus according to the embodiment of the present invention. FIG. 16 is a side view in which the CCD detector 6 is viewed in the horizontal transfer direction.

As shown in FIG. 16, when compared with the optical system 5 shown in FIG. 8, the modification of the optical system 5 further includes a light-collector unit 5g.

The light-collector unit 5g collects, for example, rays resulting from the splitting of light, onto light-receiving devices that are not restricted by the restriction unit 21.

More specifically, the light-collector unit 5g is a lens, for example. The lens may have a spherical shape or a cylindrical shape.

The light-collector unit 5g is provided on a light path between the focus mirror 5e and the CCD detector 6, for example. Note that the light-collector unit 5g may be provided on a light path between the slit 5a and the focus mirror 5e.

The light-collector unit 5g collects, out of the light that the light-collector unit 5g receives from the focus mirror 5e, some light with which the restriction unit 21 is irradiated if the light-collector unit 5g is not provided (see FIG. 9), onto the irradiation-target area Ar of the CCD detector 6.

With such a configuration, it is possible to increase the amount of light with which the irradiation-target area Ar is irradiated, and therefore it is possible to improve the S/N ratio of the optical spectrum that is to be measured by the optical spectrum measuring apparatus 11.

Note that the light-collector unit 5g is not limited to a lens, and may be a mirror that can collect light onto the irradiation-target area Ar of the CCD detector 6.

Also, the light-collector unit 5g may be configured to collect rays resulting from the splitting of light, onto the irradiation-target area Ar shown in FIG. 10 or FIG. 11.

Modification of Optical Spectrum Measuring System 301

Figure 17:
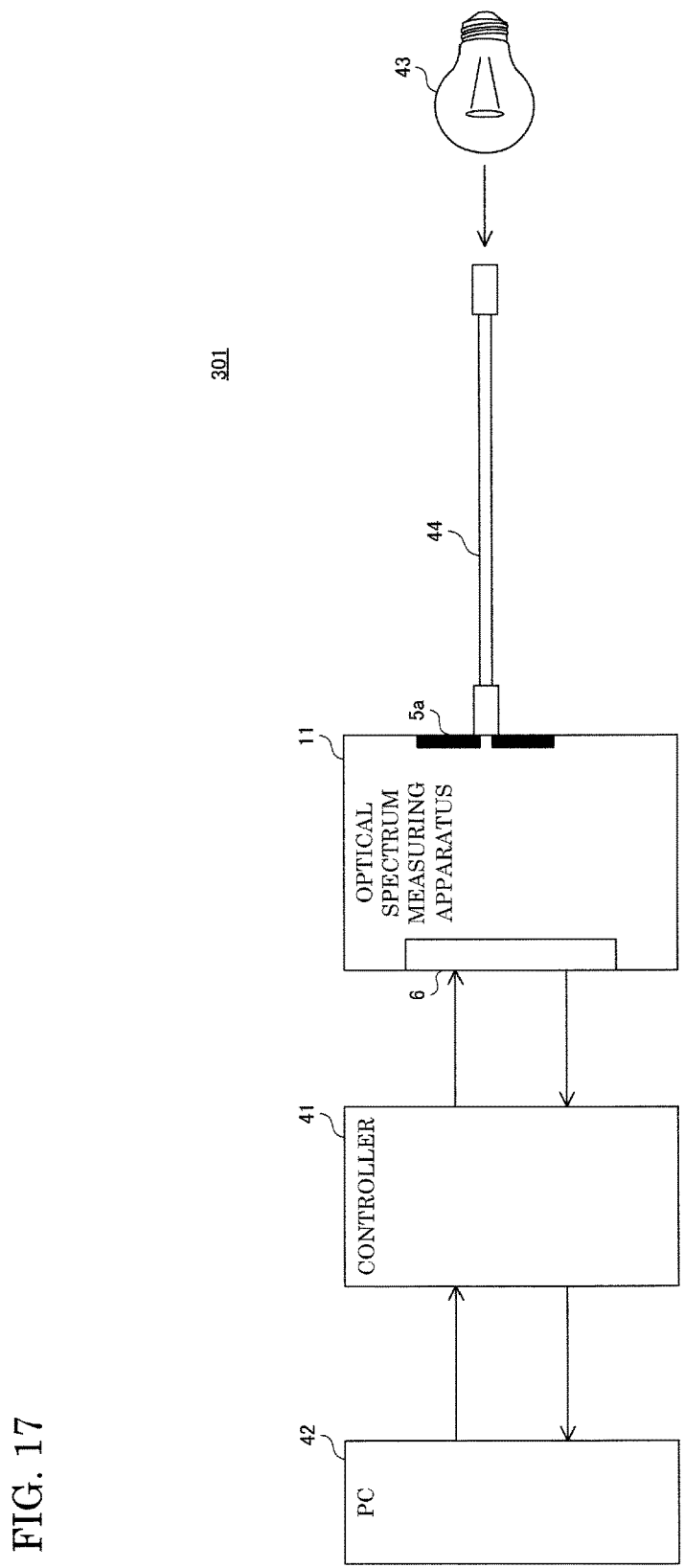
FIG. 17 shows a configuration of a modification of the optical spectrum measuring system according to the embodiment of the present invention.

FIG. 17 shows a configuration of a modification of the optical spectrum measuring system according to the embodiment of the present invention.

As shown in FIG. 17, in the modification of the optical spectrum measuring system 301, light from the object 43 enters the slit 5a of the optical spectrum measuring apparatus 11 via an optical fiber 44.

The configurations and operations of the controller 41 and the personal computer 42 in the modification of the optical spectrum measuring system 301 are respectively the same as those of the controller 41 and the personal computer 42 in the optical spectrum measuring system 301 shown in FIG. 1.

The configuration and the operations of the optical spectrum measuring apparatus 11 in the modification of the optical spectrum measuring system 301 are the same as those of the optical spectrum measuring apparatus 11 shown in FIG. 8.

First Modification of Optical Spectrum Measuring Apparatus 11

Figure 18:
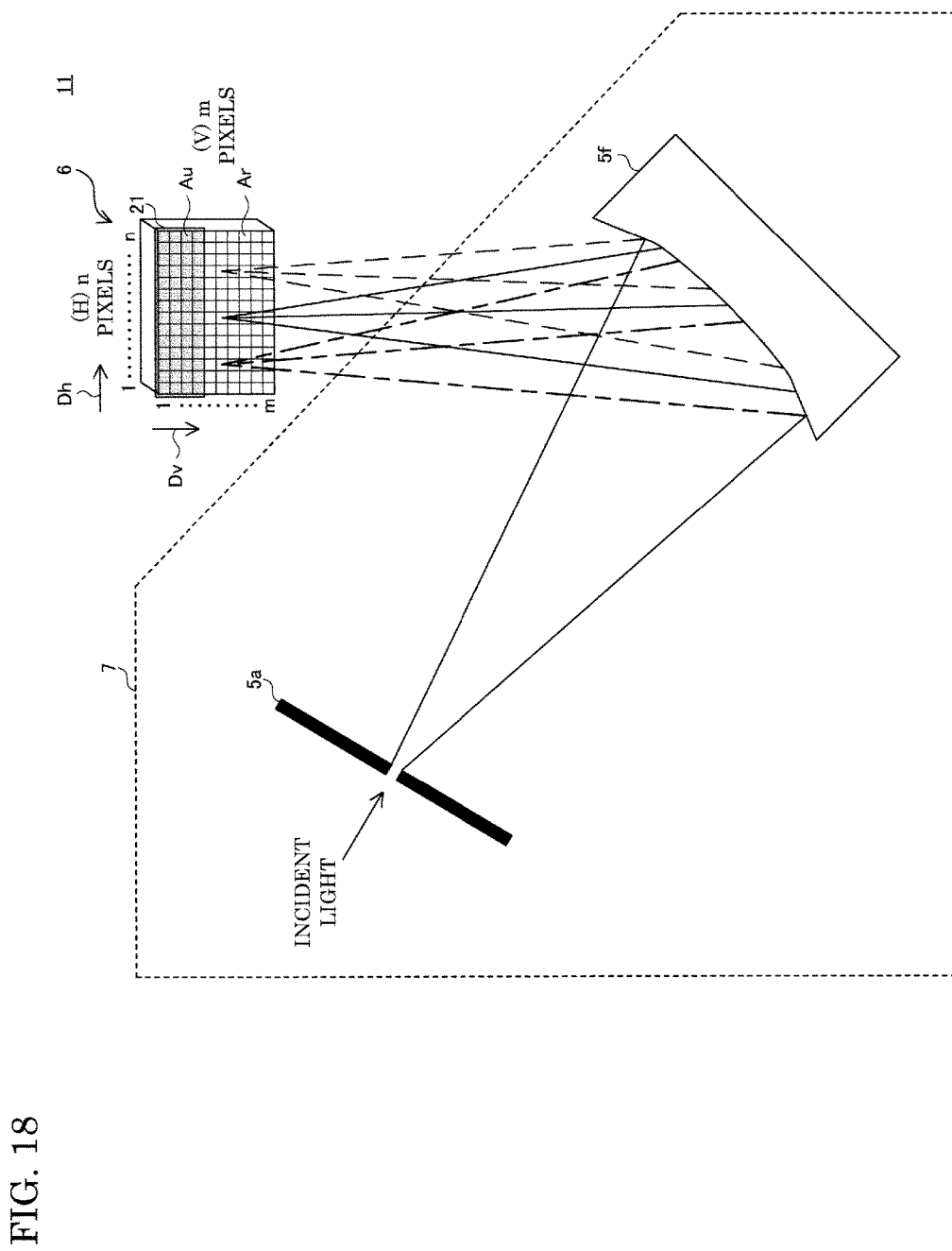
FIG. 18 shows a configuration of a modification of the optical spectrum measuring apparatus in the optical spectrum measuring system according to the embodiment of the present invention.

FIG. 18 shows a configuration of a modification of the optical spectrum measuring apparatus in the optical spectrum measuring system according to the embodiment of the present invention.

As shown in FIG. 18, when compared with the optical spectrum measuring apparatus 11 shown in FIG. 8, the first modification of the optical spectrum measuring apparatus 11 shown in FIG. 18 includes an optical system 7 instead of the optical system 5. The optical system 7 includes the slit 5a and a concave diffraction grating 5f.

The configurations and operations of the restriction unit 21, the slit 5a, and the CCD detector 6 in the first modification of the optical spectrum measuring apparatus 11 are respectively the same as those of the restriction unit 21, the slit 5a, and the CCD detector 6 in the optical spectrum measuring apparatus 11 shown in FIG. 8.

The optical spectrum measuring apparatus 11 shown in FIG. 18 is a Paschen-Runge spectrometer. The optical system 7 in the optical spectrum measuring apparatus 11 splits incident light into rays, and irradiates the CCD detector 6 with the rays.

More specifically, the concave diffraction grating 5f in the optical system 7 is, for example, a reflective diffraction grating that has a concave surface, which diffracts incident light that has passed through the slit 5a, into rays travelling in different directions, according to the wavelengths thereof and collects the diffracted incident light onto the CCD detector 6.

Second Modification of Optical Spectrum Measuring Apparatus 11

Figure 19:
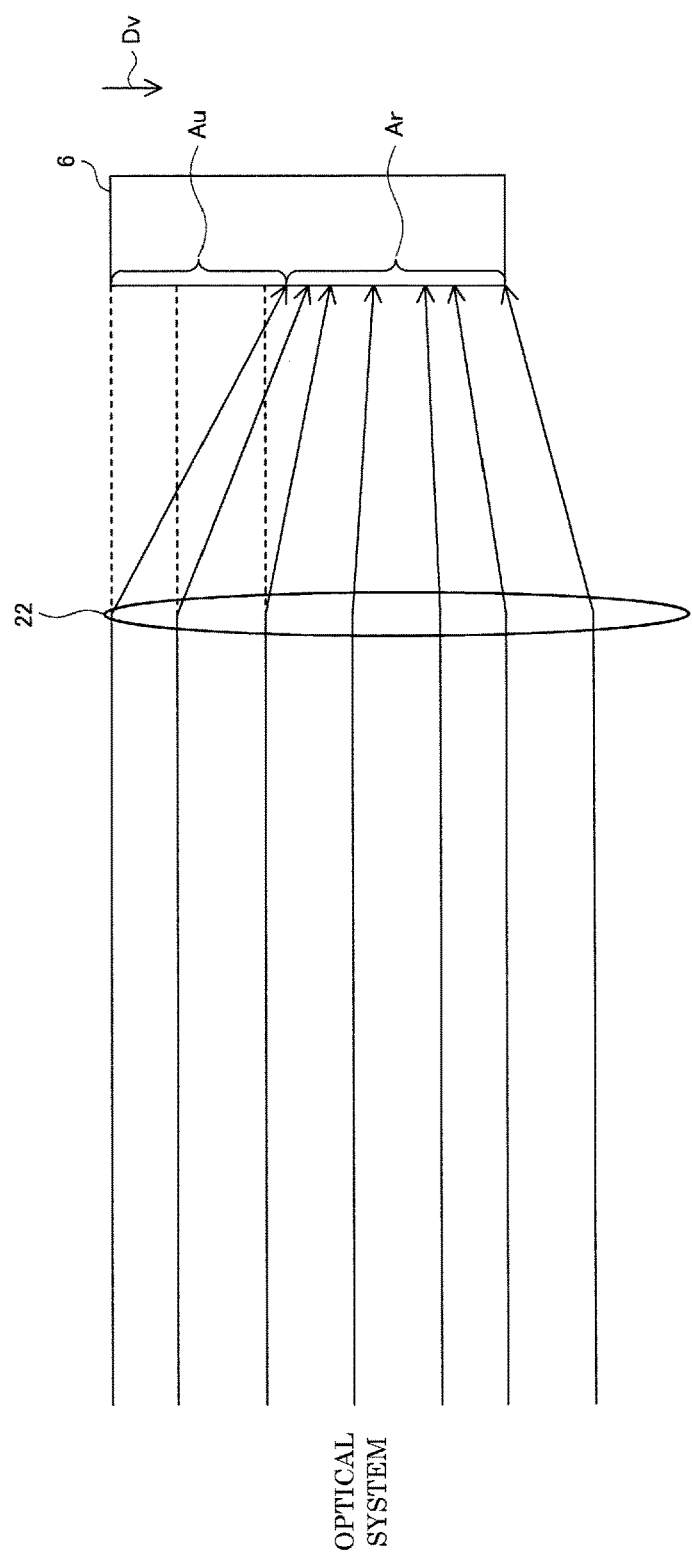
FIG. 19 shows a configuration of a modification of the optical spectrum measuring apparatus in the optical spectrum measuring system according to the embodiment of the present invention.

FIG. 19 shows a configuration of a modification of the optical spectrum measuring apparatus in the optical spectrum measuring system according to the embodiment of the present invention.

As shown in FIG. 19, when compared with the optical spectrum measuring apparatus 11 shown in FIG. 8, the second modification of the optical spectrum measuring apparatus 11 shown in FIG. 19 includes a restriction unit (restriction mechanism) 22 instead of the restriction unit 21.

The configurations and operations of the optical system 5 and the CCD detector 6 in the second modification of the optical spectrum measuring apparatus 11 are respectively the same as those of the optical system 5 and the CCD detector 6 in the optical spectrum measuring apparatus 11 shown in FIG. 8.

For example, the restriction unit 22 restricts one or more rows out of the rows of light-receiving devices from being irritated with light from the optical system 5.

Specifically, the restriction unit 22 is a lens, for example. The lens may have a spherical shape or a cylindrical shape.

The restriction unit 22 is provided on a light path between the focus mirror 5e and the CCD detector 6, for example. Note that the restriction unit 22 may be provided on a light path between the slit 5a and the focus mirror 5e.

The restriction unit 22 collects, out of the light that the restriction unit 22 receives from the focus mirror 5e, some light with which the restriction unit 21 is irradiated if the restriction unit 22 is not provided (see FIG. 9), onto the irradiation-target area Ar of the CCD detector 6, and thus the restriction unit 22 restricts the CCD detector 6 from being irradiated with light from the optical system 5.

Although the restriction unit 22 in the second modification of the optical spectrum measuring apparatus according to the embodiment of the present invention is configured to restrict one or more rows out of the rows of light-receiving devices from being irradiated with light from the optical system 5, the restriction unit 22 is not limited to such a configuration. The restriction unit 22 may be configured to restrict one or more columns out of the columns of light-receiving devices from being irradiated with light from the optical system 5, or to restrict one or more rows and one or more columns out of the rows and columns of the plurality of light-receiving devices from being irradiated with light from the optical system 5.

Operational Flow

The apparatuses in the optical spectrum measuring system 301 are respectively provided with computers, and the respective arithmetic processing units of the computers, such as CPUs, each read out a program that includes one or more or all of the steps included in the following sequence diagram or flowchart, from a memory (not shown). The programs for these apparatuses can be externally installed. The programs for the apparatuses are distributed in the state of being stored in a recording medium.

Figure 20:
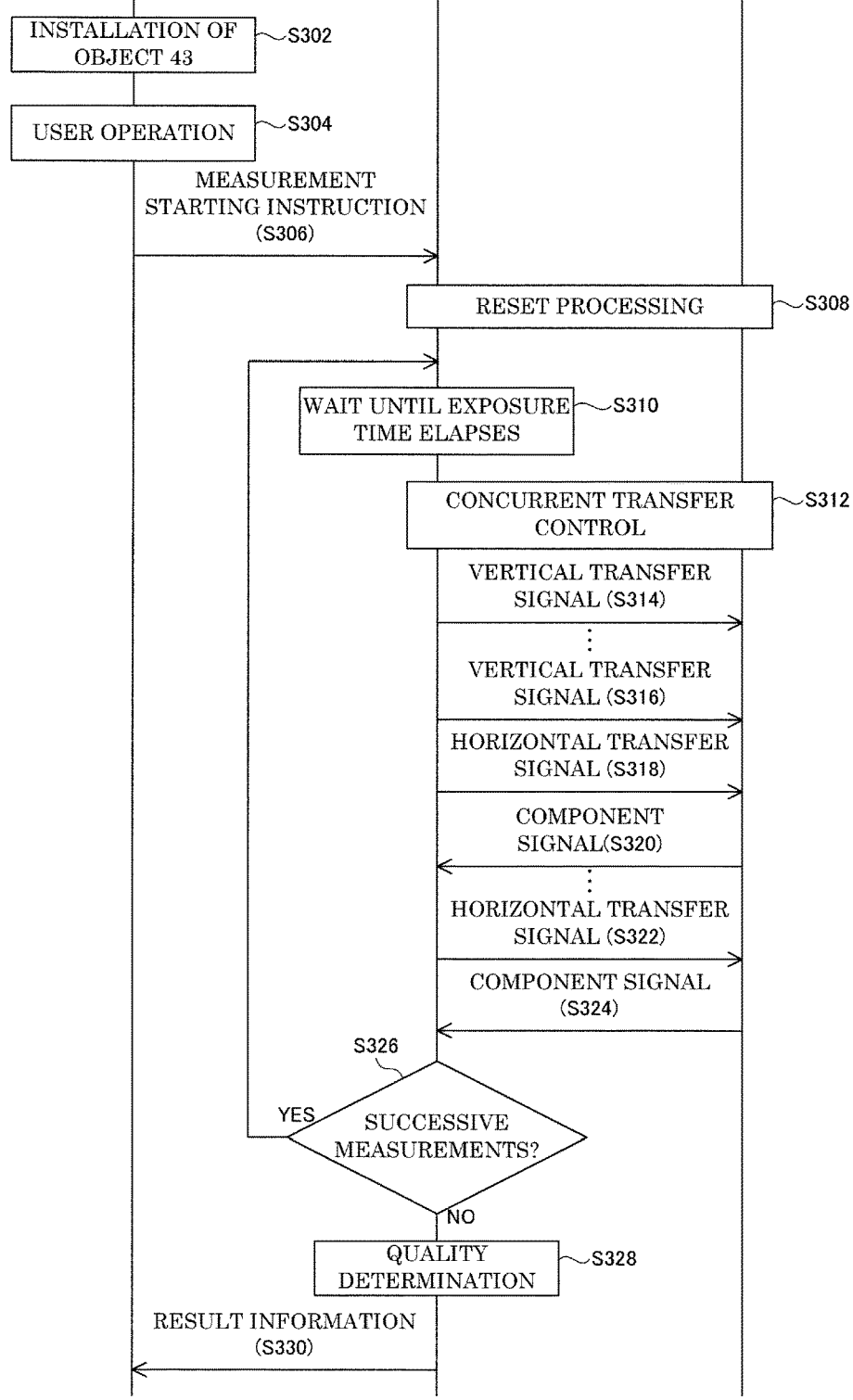
FIG. 20 shows an example of a sequence performed by the optical spectrum measuring system according to the embodiment of the present invention to measure an optical spectrum.

FIG. 20 shows an example of a sequence performed by the optical spectrum measuring system according to the embodiment of the present invention to measure an optical spectrum.

As shown in FIG. 20, first, the user installs the object 43, which is to be subjected to measurement performed by the optical spectrum measuring apparatus 11 (step S302).

Next, the user operates the personal computer 42 to start measurement (step S304).

Next, upon being operated by the user, the personal computer 42 transmits a measurement starting instruction to the controller 41 in response to the operation (step S306).

Next, the controller 41, upon receiving the measurement starting instruction from the personal computer 42, performs reset processing to clear the electrical charges accumulated in the light-receiving devices of the CCD detector 6 according to the received measurement starting instruction (step S308).

More specifically, during the reset processing, for example, the controller 41 repeatedly transmits a vertical transfer signal to the CCD detector 6 a number of times that is equal to the number of rows included in the irradiation-target area Ar of the CCD detector 6 (hereinafter also referred to as "target rows"), and thereafter repeatedly transmits a horizontal transfer signal to the CCD detector 6 a number of times that is equal to the number of columns included in the irradiation-target area Ar (hereinafter also referred to as "target columns"). When the reset processing is started is when the predetermined exposure time starts.

Next, the controller 41 waits until the aforementioned exposure time has elapsed (Step S310).

Next, the controller 41 performs concurrent transfer control to transfer the electrical charge accumulated in each light-receiving device to a column electrical charge accumulation device Cc corresponding thereto (step S312).

Next, the controller 41 transmits the first vertical transfer signal to the CCD detector 6 (step S314).

Next, if the number of target rows is three or more, the controller 41 transmits a vertical transfer signal to the CCD detector 6 one or more times, and then transmits the last vertical transfer signal, which is the last one out of the number of vertical transfer signals that is equal to the number of target rows, to the CCD detector 6 (step S316).

Next, the controller 41 transmits the first horizontal transfer signal to the CCD detector 6 (step S318).

Next, the controller 41 receives a component signal, which is a response to the first horizontal transfer signal, from the CCD detector 6 (step S320).

Next, if the number of target columns is three or more, the controller 41 transmits a horizontal transfer signal and receives a component signal one or more times, and then transmits the last horizontal transfer signal, which is the last one out of the number of horizontal transfer signals that is equal to the number of target columns, to the CCD detector 6 (step S322).

Next, the controller 41 receives a component signal that is a response to the last horizontal transfer signal, from the CCD detector 6 (step S324).

Next, if successive measurements are to be performed (YES in step S326), the controller 41 waits until the next exposure time elapses (Step S310).

On the other hand, if successive measurements are not to be performed (No in step S326), the controller 41 generates an optical spectrum from the component signals received from the CCD detector 6, and determines the quality of the object 43 by performing the predetermined arithmetic processing on the generated optical spectrum (step S328).

Next, the controller 41 transmits result information, which shows the result of determination, to the personal computer 42 (step S330).

The optical spectrum measuring apparatus according to the embodiment of the present invention is configured such that the number of restriction-target rows of the CCD detector 6 is set based on the unit measurement time. However, the optical spectrum measuring apparatus is not limited to such a configuration. The optical spectrum measuring apparatus may be configured such that the number of restriction-target rows of the CCD detector 6 is set based on the amount of light that is to be detected by the CCD detector 6. Specifically, the number of restriction-target rows of the CCD detector 6 is set based on the required S/N ratio. Also, the optical spectrum measuring apparatus may be configured such that number of restriction-target rows of the CCD detector 6 is set based on the unit measurement time and the amount of light that is to be detected by the CCD detector 6. Also, the optical spectrum measuring apparatus may be configured such that the number of restriction-target rows of the CCD detector 6 has been set to a given number regardless of the unit measurement time or the amount of light.

Although the optical spectrum measuring apparatus according to the embodiment of the present invention is configured such that the restriction targets, which are to be restricted by the restriction unit 21, are set based on conditions regarding spectrum measurement, the optical spectrum measuring apparatus is not limited to such a configuration. The optical spectrum measuring apparatus 11 may be configured such that the restriction targets, which are to be restricted by the restriction unit 21, are set based on conditions that are irrelevant to spectrum measurement. Specifically, for example, the optical spectrum measuring apparatus 11 may be configured such that the number of restriction-target rows of the CCD detector 6 are set based on the electricity storage capacity of the row electrical charge accumulation devices Cr of the row shift register Sr. More specifically, the number of restriction target rows of the CCD detector 6 is set such that, when the electrical charge accumulated in each column electrical charge accumulation device Cc of the column shift registers Sc is to be transferred to a row electrical charge accumulation device Cr corresponding thereto through binning processing, the total amount of electrical charge to be transferred does not exceed the electricity storage capacity of the row electrical charge accumulation device Cr.

Although the optical spectrum measuring apparatus according to the embodiment of the present invention is configured such that one or more columns other than a plurality of columns that respectively correspond to a plurality of wavelengths of an optical spectrum that is to be acquired by the optical spectrum measuring apparatus 11 are set as restriction targets, the optical spectrum measuring apparatus 11 is not limited to such a configuration. The optical spectrum measuring apparatus 11 may be configured such that one or more columns are set as restriction targets based on other conditions, regardless of the plurality of wavelengths of the optical spectrum that is to be acquired by the optical spectrum measuring apparatus 11.

Although the optical spectrum measuring apparatus according to the embodiment of the present invention is configured to perform binning processing, the optical spectrum measuring apparatus is not limited to such a configuration. The optical spectrum measuring apparatus 11 may be configured not to perform binning processing. Specifically, the optical spectrum measuring apparatus 11 may be configured such that the electrical charges accumulated in the plurality of light-receiving devices are separately read out.

Although the optical spectrum measuring apparatus according to the embodiment of the present invention is configured such that the restriction-target area Au is provided so as to include the first row, i.e. the $1^{st}$ row, from a starting point in the vertical transfer direction Dv, the optical spectrum measuring apparatus is not limited to such a configuration. The optical spectrum measuring apparatus may be configured such that the restriction-target area Au is provided so as not to include the first row from a starting point in the vertical transfer direction Dv.

Specifically, if the restriction-target area Au of the CCD detector 6 shown in FIG. 12 includes the $3^{rd}$ row and the $4^{th}$ row, and the irradiation-target area Ar includes the $1^{st}$ row and the $2^{nd}$ row, correct component signals can be acquired by performing the following method.

That is, upon a first exposure time elapsing, the controller 41 provides each column shift register Sc with a vertical transfer signal Vc1 twice, and thus shifts the electrical charges accumulated in the column electrical charge accumulation devices Cc that each belong to a column, in the vertical transfer direction Dv.

Here, the electrical charge accumulated in each column electrical charge accumulation device Cc in the restriction-target area Au is transferred to a row electrical charge accumulation device Cr of the row shift register Sr corresponding to the column to which the column electrical charge accumulation device Cc belongs. Also, the electrical charge accumulated in each column electrical charge accumulation device Cc in the irradiation-target area Ar is transferred to a column electrical charge accumulation device Cc corresponding thereto in the restriction-target area Au.

Next, the controller 41 provides the row shift register Sr with a horizontal transfer signal Hc1 four times to clear the electrical charges accumulated in the row electrical charge accumulation devices Cr that belong to the row shift register Sr. Here, the controller 41 discards component signals that have been received from the output unit 6a.

Next, upon a second exposure time elapsing, the controller 41 provides each column shift register Sc with a vertical transfer signal Vc1 twice, and thus shifts the electrical charges accumulated in the column electrical charge accumulation devices Cc that each belong to a column, in the vertical transfer direction Dv.

Here, the electrical charge accumulated in each column electrical charge accumulation device Cc in the restriction-target area Au, i.e. the electrical charge accumulated during the first exposure time, is transferred to a row electrical charge accumulation device Cr corresponding to the column to which the column electrical charge accumulation device Cc belongs. Also, the electrical charge accumulated in each column electrical charge accumulation device Cc in the irradiation-target area Ar, i.e. the electrical charge accumulated during the second exposure time, is transferred to a column electrical charge accumulation device Cc corresponding thereto in the restriction-target area Au.

Next, the controller 41 provides the row shift register Sr with a horizontal transfer signal Hc1 four times, and thus sequentially acquires component signals that are based on the electrical charges accumulated during the first exposure time.

Although the optical spectrum measuring apparatus according to the embodiment of the present invention is configured such that the restriction-target area Au is provided so as to include the first column, i.e. the $1^{st}$ column, from a starting point in the horizontal transfer direction Dh, the optical spectrum measuring apparatus is not limited to such a configuration. The optical spectrum measuring apparatus may be configured such that the restriction-target area Au is provided so as not to include the first column from a starting point in the horizontal transfer direction Dh.

Specifically, if the restriction-target area Au of the CCD detector 6 shown in FIG. 12 includes the $3^{rd}$ column and the $4^{th}$ column, and the irradiation-target area Ar includes the $1^{st}$ column and the $2^{nd}$ column, correct component signals can be acquired by performing the following method.

That is, the controller 41 provides the row shift register Sr with a horizontal transfer signal Hc1 twice to clear the electrical charges accumulated in the row electrical charge accumulation devices Cr corresponding to the irradiation-target area Ar. Here, the controller 41 discards component signals that have been received from the output unit 6a.

Next, upon the first exposure time elapsing, the controller 41 provides each column shift register Sc with a vertical transfer signal Vc1 four times, and thus shifts the electrical charges accumulated in the column electrical charge accumulation devices Cc that each belong to a column, in the vertical transfer direction Dv.

Here, the electrical charge accumulated in each column electrical charge accumulation device Cc in the irradiation-target area Ar is transferred to a row electrical charge accumulation device Cr of the row shift register Sr corresponding to the column to which the column electrical charge accumulation device Cc belongs.

Next, the controller 41 provides the row shift register Sr with a horizontal transfer signal Hc1 twice, and thus transfers the electrical charges accumulated in the row electrical charge accumulation devices Cr corresponding to the irradiation-target area Ar, i.e., the electrical charges accumulated during the first exposure time, to the row electrical charge accumulation devices Cr corresponding to the restriction-target area Au. Here, the controller 41 discards component signals that have been received from the output unit 6a.

Next, upon the second exposure time elapsing, the controller 41 provides each column shift register Sc with a vertical transfer signal Vc1 four times, and thus shifts the electrical charges accumulated in the column electrical charge accumulation devices Cc that each belong to a column, in the vertical transfer direction Dv.

Here, the electrical charge accumulated in each column electrical charge accumulation device Cc in the irradiation-target area Ar is transferred to a row electrical charge accumulation device Cr of the row shift register Sr corresponding to the column to which the column electrical charge accumulation device Cc belongs.

Next, the controller 41 provides the row shift register Sr with a horizontal transfer signal Hc2 twice, and thus sequentially acquires component signals that are based on the electrical charges accumulated during the first exposure time. Also, the controller 41 transfers the electrical charges accumulated in the row electrical charge accumulation devices Cr corresponding to the irradiation-target area Ar, i.e. the electrical charges accumulated during the second exposure time, to the row electrical charge accumulation devices Cr corresponding to the restriction-target area Au.

In a configuration in which the restriction-target area Au is provided so as not to include the first row from a starting point in the vertical transfer direction Dv, and a configuration in which the restriction-target area Au is provided so as not to include the first column from a starting point in the horizontal transfer direction Dh, the controller 41 acquires component signals that are based on the electrical charges accumulated during the first exposure time, upon the second exposure time elapsing.

In contrast, as shown in FIGS. 8, 10, and 11, in a configuration in which the restriction-target area Au is provided so as to include the first row from a starting point in the vertical transfer direction Dv, and a configuration in which the restriction-target area Au is provided so as to include the first column from a starting point in the horizontal transfer direction Dh, the controller 41 can acquire component signals that are based on the electrical charges accumulated during the first exposure time in a shorter time. Specifically, the controller 41 acquires the component signals during the second exposure time or before the second exposure time, for example.

For example, a configuration in which the CCD detector disclosed in Patent Document 1 and so on is employed as a light-receiving means of an optical spectrum measuring apparatus can be conceived of. There is demand for technology for providing a superior apparatus for measuring an optical spectrum, using such a configuration.

Considering such a demand, in the optical spectrum measuring apparatus according to the embodiment of the present invention, the CCD detector 6 includes a plurality of light-receiving devices that are two-dimensionally arranged. The optical system 5 splits incident light into rays, and irradiates the CCD detector 6 with the rays. The restriction unit 21 restricts one or more rows and/or one or more columns out of the rows and columns of the plurality of light-receiving devices from being irradiated with light from the optical system 5.

With such a configuration, a general-purpose CCD detector 6, for example, is restricted from being irradiated with light, and therefore it is possible to realize a CCD detector in which the detection area is downsized, without developing a new CCD detector, and consequently, it is possible to reduce the development costs of an apparatus. Also, since it is possible to reduce the number of rows and/or the number of columns to be irradiated with light, it is possible to reduce the time required to perform processing to acquire electrical charges generated in the light-receiving devices, compared to a configuration in which the area to be irradiated with light is not restricted. Therefore, it is possible to provide a superior optical spectrum measuring apparatus.

In the optical spectrum measuring apparatus according to the embodiment of the present invention, the restriction target, which is to be restricted by the restriction unit 21, is set based on conditions regarding spectrum measurement.

With such a configuration, it is possible to set an appropriate restriction target that matches the contents of an optical spectrum that is to be measured.

In the optical spectrum measuring apparatus according to the embodiment of the present invention, each of the rays, resulting from the splitting of light performed by the optical system 5 and having different wavelengths, enters a column corresponding thereto. The number of restriction-target rows is set based on the time required for the CCD detector 6 to measure one optical spectrum and/or the amount of light that is to be detected by the CCD detector 6.

With such a configuration, it is possible to complete measurement of an optical spectrum within a desired measurement time, or realize measurement of an optical spectrum that satisfies a desired S/N ratio, for example.

In the optical spectrum measuring apparatus according to the embodiment of the present invention, each of the rays, resulting from the splitting of light performed by the optical system 5 and having different wavelengths, enters a column corresponding thereto. One or more columns other than a plurality of columns that respectively correspond to a plurality of wavelengths of an optical spectrum that is to be acquired by the optical spectrum measuring apparatus 11 are set as restriction targets.

With such a configuration, it is possible to efficiently measure an optical spectrum that has a desired wavelength range.

In the optical spectrum measuring apparatus according to the embodiment of the present invention, the optical system 5 includes the light-collector unit 5g that collects the rays resulting from the splitting of incident light, onto light-receiving devices that are not restricted by the restriction unit 21.

With such a configuration, it is possible to increase the intensity of light with which light-receiving devices that are to be used are irradiated, and therefore it is possible to improve the S/N ratio of the optical spectrum.

In the optical spectrum measuring apparatus according to the embodiment of the present invention, the CCD detector 6 includes a plurality of column shift registers Sc, each of which is provided for a column, and for each of which a plurality of column electrical charge accumulation devices Cc are provided respectively in correspondence with a plurality of light-receiving devices that belong to the column, and a row shift register Sr, for which a plurality of row electrical charge accumulation devices Cr are provided respectively in correspondence with the column shift registers Sc. Each column shift register Sc transfers electrical charges accumulated in a column electrical charge accumulation device Cc thereof corresponding to a light-receiving device that belongs to a row, to a column electrical charge accumulation device Cc thereof corresponding to a light-receiving device that belongs to another row, or to a row electrical charge accumulation device Cr corresponding thereto of the row shift register Sr.

In this way, with the configuration for collecting, for each column, electrical charges generated by light-receiving devices irradiated with light, it is possible to efficiently acquire a desired amount of electrical charge for each wavelength.

Also, with the optical spectrum measuring apparatus according to the embodiment of the present invention, the restriction unit 21 restricts one or more rows and one or more columns out of the rows and columns from being irradiated with light from the optical system 5.

With such a configuration, it is possible to reduce both the number of rows and the number of columns to be irradiated with light, and therefore it is possible to further reduce the time required to acquire electrical charges generated in the light-receiving devices.

Also, according to the optical spectrum measuring method according to the embodiment of the present invention, first, incident light is split into rays, and irradiates the CCD detector 6 with the rays. Next, electrical charges that have been generated by the plurality of light-receiving devices using the rays with which the CCD detector 6 is irradiated are acquired. Then, when the CCD detector 6 is irradiated with light, one or more rows and/or one or more columns out of the rows and columns of the plurality of light-receiving devices are restricted from being irradiated with the rays resulting from the splitting of the incident light.

With such a method, a general-purpose CCD detector 6, for example, is restricted from being irradiated with light, and therefore it is possible to realize a CCD detector in which the detection area is downsized, without developing a new CCD detector, and consequently, it is possible to reduce the development costs of an apparatus. Also, since it is possible to reduce the number of rows and/or the number columns to be irradiated with light, it is possible to reduce the time required to perform processing to acquire electrical charges generated in the light-receiving devices, compared to a configuration in which the area to be irradiated with light is not restricted. Therefore, it is possible to provide a superior optical spectrum measuring apparatus.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An optical spectrum measuring apparatus comprising:
    a CCD (Charge Coupled Device) detector including a plurality of light-receiving devices that are two-dimensionally arranged;
    an optical system configured to split incident light into rays and irradiate the CCD detector with the rays; and
    a restriction unit configured to restrict one or more rows and/or one or more columns out of the rows and columns of the plurality of light-receiving devices from being irradiated with light from the optical system;
    wherein a restriction target that is to be restricted by the restriction unit is set based on a condition regarding spectrum measurement;
    each of the rays, resulting from the splitting of incident light performed by the optical system and having different wavelengths, enters a column corresponding thereto, and
    the number of rows that are the restriction targets is set based on the time required for the CCD detector to measure one optical spectrum and/or the amount of light that is to be detected by the CCD detector.

2. The optical spectrum measuring apparatus according to claim 1,
    wherein one or more columns other than a plurality of columns that respectively correspond to a plurality of wavelengths of an optical spectrum that is to be acquired by the optical spectrum measuring apparatus are set as the restriction targets.

3. The optical spectrum measuring apparatus according to claim 1,
    wherein the optical system includes a light-collector unit that collects the rays resulting from the splitting of incident light, onto light-receiving devices that are not restricted by the restriction unit.

4. The optical spectrum measuring apparatus according to claim 1,
    wherein the restriction unit restricts one or more rows and one or more columns out of the rows and columns from being irradiated with light from the optical system.

5. An optical spectrum measuring apparatus comprising:
    a CCD (Charge Coupled Device) detector including a plurality of light-receiving devices that are two-dimensionally arranged;
    an optical system configured to split incident light into rays and irradiate the CCD detector with the rays; and
    a restriction unit configured to restrict one or more rows and/or one or more columns out of the rows and columns of the plurality of light-receiving devices from being irradiated with light from the optical system;
    wherein the CCD detector includes a plurality of column shift registers, each of which is provided for a column, and for each of which a plurality of column electrical charge accumulation devices are provided respectively in correspondence with the plurality of light-receiving devices that belong to the column, and a row shift register, for which a plurality of row electrical charge accumulation devices are provided respectively in correspondence with the column shift registers, and
    each column shift register transfers electrical charges accumulated in a column electrical charge accumulation device thereof corresponding to a light-receiving device that belongs to a row, to a column electrical charge accumulation device thereof corresponding to a light-receiving device that belongs to another row, or to a row electrical charge accumulation device corresponding thereto of the row shift register.

6. An optical spectrum measuring method that is employed in an optical spectrum measuring apparatus that is provided with a CCD detector including a plurality of light-receiving devices that are two-dimensionally arranged, comprising:
    a step of splitting incident light into rays and irradiating the CCD detector with the rays; and
    a step of acquiring electrical charges generated by the plurality of light-receiving devices using the rays with which the CCD detector is irradiated,
    wherein, in the step of irradiating the CCD detector with rays, one or more rows and/or one or more columns out of the rows and columns of the plurality of light-receiving devices are restricted from being irradiated with the rays resulting from the splitting of the incident light;
    a restriction target that is to be restricted is set based on a condition regarding spectrum measurement;
    each of the rays, resulting from the splitting of incident light having different wavelengths, enters a column corresponding thereto, and
    the number of rows that are the restriction targets is set based on the time required for the CCD detector to measure one optical spectrum and/or the amount of light that is to be detected by the CCD detector.

7. An optical spectrum measuring method that is employed in an optical spectrum measuring apparatus that is provided with a CCD detector including a plurality of light-receiving devices that are two-dimensionally arranged, comprising:
- a step of splitting incident light into rays and irradiating the CCD detector with the rays; and
- a step of acquiring electrical charges generated by the plurality of light-receiving devices using the rays with which the CCD detector is irradiated;
- wherein, in the step of irradiating the CCD detector with rays, one or more rows and/or one or more columns out of the rows and columns of the plurality of light-receiving devices are restricted from being irradiated with the rays resulting from the splitting of the incident light;
- the CCD detector includes a plurality of column shift registers, each of which is provided for a column, and for each of which a plurality of column electrical charge accumulation devices are provided respectively in correspondence with the plurality of light-receiving devices that belong to the column, and a row shift register, for which a plurality of row electrical charge accumulation devices are provided respectively in correspondence with the column shift registers, and
- each column shift register transfers electrical charges accumulated in a column electrical charge accumulation device thereof corresponding to a light-receiving device that belongs to a row, to a column electrical charge accumulation device thereof corresponding to a light-receiving device that belongs to another row, or to a row electrical charge accumulation device corresponding thereto of the row shift register.

* * * * *